United States Patent

Psaltis et al.

Patent Number: 5,978,112
Date of Patent: *Nov. 2, 1999

[54] NON-VOLATILE READOUT OF SHIFT MULTIPLEXED HOLOGRAMS

[75] Inventors: Demetri Psaltis, Pasadena; Fai Mok, West Hills; George Barbastathis, Pasadena, all of Calif.

[73] Assignee: California Institute of Technology, Pasadena, Calif.

[*] Notice: This patent is subject to a terminal disclaimer.

[21] Appl. No.: 08/753,403

[22] Filed: Nov. 25, 1996

Related U.S. Application Data

[63] Continuation-in-part of application No. 08/389,890, Feb. 15, 1995, Pat. No. 5,671,073.

[51] Int. Cl.⁶ .................................................. G03H 1/26
[52] U.S. Cl. ........................... 359/22; 359/10; 359/11; 359/29; 359/30; 365/125; 369/103
[58] Field of Search .................... 359/10, 11, 22, 359/24, 29, 30, 32; 365/125; 369/103

[56] References Cited

U.S. PATENT DOCUMENTS

| | | |
|---|---|---|
| 4,420,829 | 12/1983 | Carlson .................................. 369/103 |
| 5,438,439 | 8/1995 | Mok et al. ................................ 359/10 |
| 5,671,073 | 9/1997 | Psaltis et al. ............................. 359/10 |

*Primary Examiner*—Cassandra Spyrou
*Assistant Examiner*—Darren E. Schuberg
*Attorney, Agent, or Firm*—Michaelson & Wallace

[57] ABSTRACT

The present invention is a holographic reconstruction device for reconstructing successive holograms previously recorded by a recording reference beam in a recording medium, each previously recorded successive hologram being spaced apart a recording displacement. The recording reference beam has a recording wavelength in the range where the recording medium is photosensitive and a recording propagation angle. The device comprises a reconstruction mechanism having a reconstruction reference beam with a reconstruction wavelength in the range where the recording medium is relatively photo-insensitive and a reconstruction propagation angle. The reconstruction reference beam is provided onto the recording medium. Also, a succession of relative displacements in the recording medium is produced and each of the displacements are equal to the distance of the recording displacements with which the holograms were previously recorded. In addition, a detection device detects reconstruction of the previously recorded holograms at the reconstruction wavelength.

155 Claims, 14 Drawing Sheets

NON-VOLATILE READOUT OF SHIFT MULTIPLEXED HOLOGRAMS

CROSS-REFERENCE TO RELATED APPLICATIONS

This application is a continuation-in-part of application Ser. No. 08/389,890 filed Feb. 15, 1995 by Psaltis et al. entitled "HOLOGRAPHIC STORAGE USING SHIFT MULTIPLEXING" now U.S. Pat. No. 5,671,073, which application is incorporated herein by reference.

ORIGIN OF THE INVENTION

The U.S. Government has certain rights in this invention pursuant to Grant No. F49620-92-J-0400 awarded by the United States Air Force.

BACKGROUND OF THE INVENTION

1. Technical Field

The present invention relates to holographic memories, holographic storage systems and holographic processors.

2. Background Art

The traditional advantages of 3-D holographic memories are high storage density and parallel access capability. These features were recognized in the early 1960's and serious efforts towards the practical implementation of such memories were undertaken. Unfortunately, these efforts did not produce commercially viable memories. In recent years there has been a resurgence of interest in 3-D optical storage due to a considerable improvement in the understanding and availability of storage media, a dramatic improvement in optoelectronic components in general, and most importantly, the emergence of applications, such as image processing, neural networks, and data bases where the capabilities of these memories can be effectively utilized. This recent activity has culminated in the storage of $10^4$ 320×220 pixel holograms in a volume roughly equal to 2 cm$^3$. If spatial light modulators with 1 million pixels are used, then the storage density achievable today is in excess of $10^9$ bits per cm$^3$.

Volume holograms are usually recorded using angular, wavelength, phase code, and spatial multiplexing. In addition, peristrophic multiplexing, a holographic technique that applies to either thin or thick (3-D) media, was recently introduced. Any of these methods, or certain combinations of them, can be used to multiplex holograms for holographic storage devices. All of these methods employ a reference beam consisting of a single plane wave, which may have a phase code imprinted on the wavefront.

Spherical waves can also be used as a reference beam. A volume hologram recorded with a spherical wave reference becomes Bragg mismatched when it is translated with respect to the readout beam by an amount denoted as shift selectivity δ. This distance is usually on the order of a few microns up to a few hundreds of microns, depending on the geometry, the material thickness and the distance of the focus of the spherical wave to the hologram. Multiplexing is realized by recording a new hologram after shifting by δ. This method is called shift multiplexing and is convenient in 3D holographic disk configuration, since disk rotation produces the required relative shift.

The novel method of shift multiplexing was disclosed in the co-pending U.S. patent application Ser. No. 08/389,890. The main property of the shift multiplexing method is that it uses non-planar wavefront for the reference beam, and as a result the Bragg mismatch required to superimpose multiplex holograms without significant crosstalk is produced by translation rather than angular or wavelength change. Shift multiplexing is applicable to any kind of volume holographic material.

In addition, in photorefractive materials photoexcitation effects during hologram readout, or even thermal excitation during dark storage, cause the holograms to decay with time, and eventually to be erased. The problem of non-destructive readout was recently addressed in "Non-volatile storage in photorefractive crystals", by D. Psaltis et al., Optics Letters 19, 210, 1994. This reference disclosed the "two lambda method" in which the hologram is recorded at a wavelength where the photorefractive material is sensitive, e.g. 488 nm, but read out at a wavelength where the absorption is relatively low, e.g. 633 nm. However, these references did not provide a solution for storage in photorefractives using shift multiplexing.

It is the objective of this invention to apply a two-lambda technique to shift multiplexed holograms so that non-volatile readout of shift-multiplexed photorefractive disks can be achieved. In this way the advantages of shift multiplexing can be combined with long-term storage in a read/write memory configuration.

SUMMARY OF THE INVENTION

This invention is embodied in a method for reading out, at a readout wavelength, shift-multiplexed holograms recorded at a recording wavelength with a spherical wave reference, a reference consisting of a fan of plane waves, or an otherwise non-planar wavefront reference beam.

In the case of using a spherical wave reference, the shift-multiplexed holograms are recorded with a reference beam produced by a point source at the recording wavelength where the recording material is photosensitive. The recording point source must be located a certain distance from the recording material in the axial direction. Successive holograms are recorded after shifting the recording material by a distance equal to a shift selectivity. The shift selectivity is calculated at the readout wavelength. At readout, the point source used to produce the reference beam must be relocated in the axial direction by an amount related to the axial distance of the recording reference beam and the ratio of the recording wavelength to the readout wavelength. In addition, the readout reference beam must be translated with respect to the recording location by an amount related to the ratio of the recording wavelength to the readout wavelength and the angle of incidence of the reference beam. When shift-multiplexed holograms are read-out in this manner, the reconstruction is over only a limited strip out of the spatial extent of the stored image in the case of Fourier-transform holograms, and over only a finite spatial frequency band in the case of image-plane holograms.

In the case of using a fan of plane waves as reference, the shift-multiplexed holograms are recorded with a fan that is tilted with respect to the recording medium, and separated by the shift selectivity calculated at the readout wavelength. The holograms are read-out at the readout wavelength using a reference beam consisting of a fan of plane waves incident normally on the holographic material. From the properties of diffractive optical elements, as a result, both reference beams (recording and readout) can be produced by the same diffractive optical element (e.g. a Dammann grating) that is imaged on the holographic material using, for example, a 4-F imaging system or a thin (i.e. non-volume) hologram diffracting the desired fan of plane waves when illuminated by a single plane wave. As in the case of a spherical wave reference, the reconstruction is over only a limited strip out of the spatial extent of the stored image in the case of Fourier-transform holograms, and over only a finite spatial frequency band in the case of image-plane holograms.

DETAILED DESCRIPTION OF THE PREFERRED EMBODIMENTS

The present invention multiplexes holograms using a reference beam consisting of a spherical wave or a spectrum of plane waves (similar to phase code multiplexing, for example). Multiplexing is achieved by shifting (translating) the recording medium with respect to the signal and reference beams. Alternatively the two beams can be translated in tandem with respect to the stationary medium.

Figure 1:
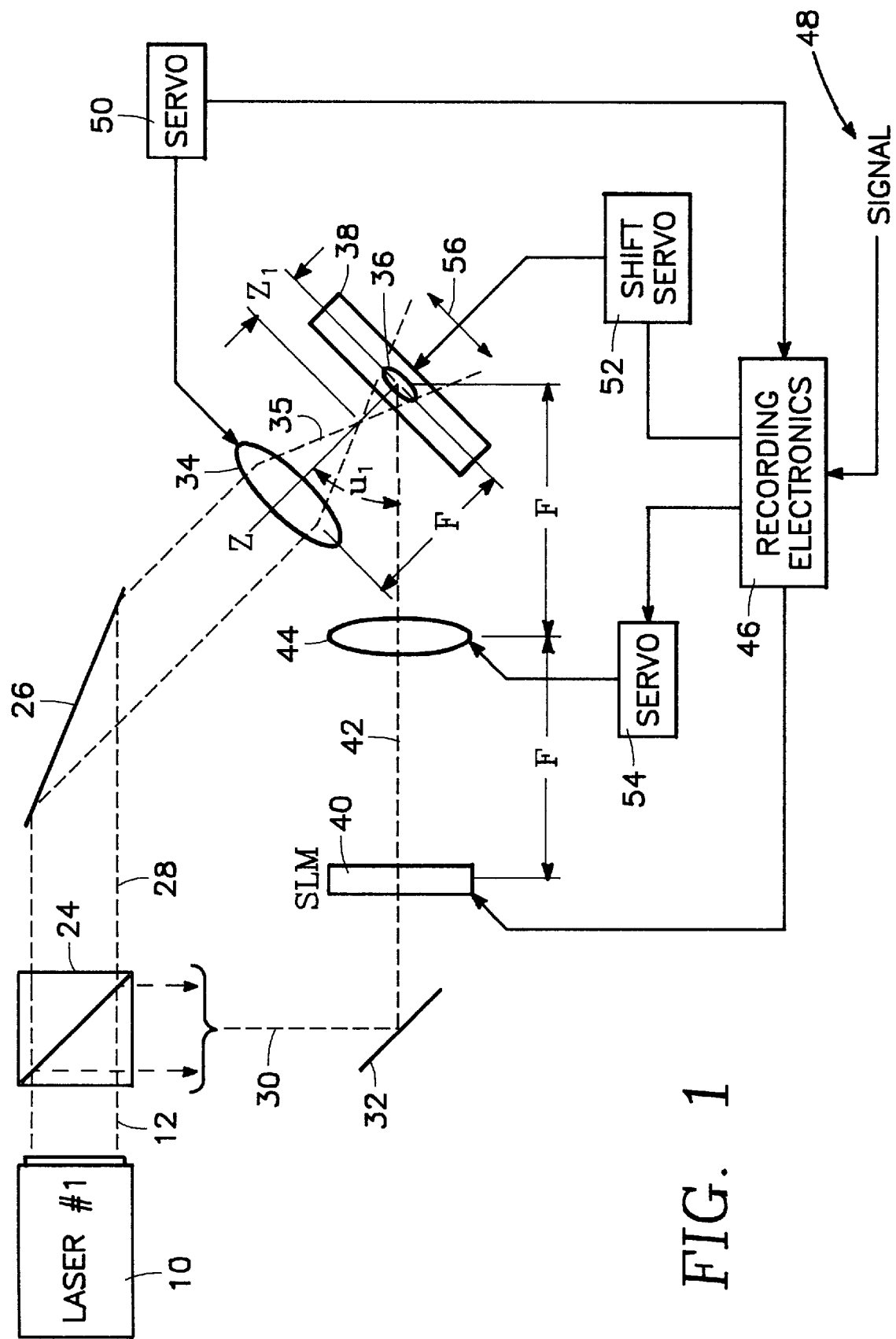
FIG. 1 is a schematic block diagram of a holographic storage system in recording mode in accordance with one embodiment of the invention employing Fourier plane geometry with a spherical wave as the reference beam.

FIG. 1 is a schematic block diagram of a holographic storage system in recording mode in accordance with a first embodiment of the invention employing Fourier plane geometry with a spherical wave as the reference beam. A first laser 10 furnishes a first laser beam 12 with wavelength $\lambda_1$ to a beam splitter 24. The beam splitter 24 splits the first laser beam 12 into a first split beam 28 and a second split beam 30 between a first mirror 26 and a second mirror 32, respectively. The first split beam 28 of the first laser beam 12 is diverted by the first mirror 26 through a first spherical lens 34. The first spherical lens 34 Fourier transforms the first split beam 28 into a single spherical wave beam source 35. The spherical wave beam source 35 is also referred to as a reference beam 35 for the holographic recording.

The first spherical lens 34 has focal length F and images the reference beam emanating from the first mirror 26 onto a recording spot 36 in an optical recording medium 38. The optical recording medium 38 is a photosensitive material, such as a photorefractive crystal, e.g., $LiNbO_3$ (lithium niobate) or SBN (strontium barium niobate). The second split beam 30 of the first laser beam 12 is diverted to the second mirror 32 and is modulated by a spatial light modulator 40 to provide a signal beam 42 for recording a hologram in the optical recording medium 38. The signal beam 42 is Fourier-transformed by a second spherical lens 44 of focal length F, onto the same recording spot 36 in the recording medium 38 that is illuminated by the reference beam 35. As indicated in FIG. 1, the distance between the spatial light modulator 40 and the center of the second spherical lens 44 is F. In addition, the distance between the center of the second spherical lens 44 and the plane of the recording medium 38 is preferably F.

During recording of a hologram in the medium, recording electronics 46 controls the spatial light modulator 40 in accordance with an information signal representing, for example, an image or a data page. A shift servo 52 under control of the recording electronics 46 governs the amount of shift between the recording medium 38 and the optical beams with the recording of successive holograms. The shift servo 52 translates the recording medium 38 in the direction indicated by arrow 56. The recording electronics 46 is coupled to an electrical signal 48 for controlling servos 50, 52, 54. The servos 50, 52, 54 actuate the movement of the first spherical lens 34, the recording medium 38, and the second spherical lens 44. The operation of the recording electronics 46 and the servos 50, 52, 54 will be discussed in detail below.

Figure 2:
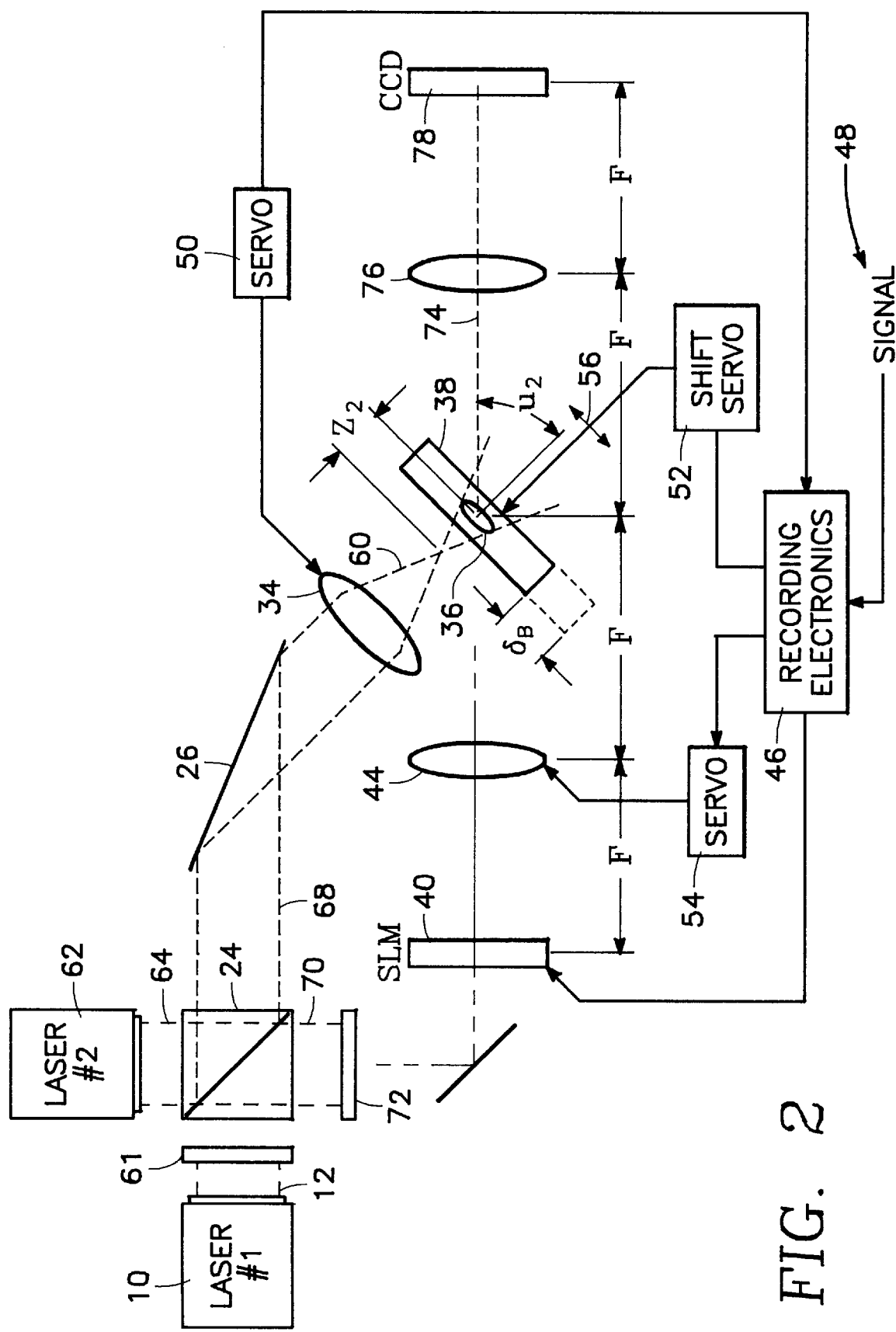
FIG. 2 is a schematic block diagram of a holographic storage system in reconstruction mode in accordance with one embodiment of the invention employing Fourier plane geometry with a spherical wave as the reference beam.

FIG. 2 is a schematic block diagram of a holographic storage system in reconstruction mode in accordance with one embodiment of the invention employing the Fourier plane geometry with a spherical wave as the reference beam. For reconstruction of a hologram previously recorded in the recording medium 38 of FIG. 1, a reference beam 60 is applied to the recording spot 36 of the recording medium 38. The first laser beam 12 of the laser 10 is blocked by a shutter 61. As a result, the signal beam 42 and reference beam 28 of FIG. 1 are not produced. Instead, a second laser 62 furnishes a second laser beam 64 with wavelength $\lambda_2$ to the beam splitter 24. The beam splitter 24 splits the second laser beam 64 into a first split beam 68 and a second split beam 70. However, the second split beam 70 of the second laser beam 64 is blocked by a second shutter 72. The first split beam 68 of the second laser beam 64 is diverted to the first mirror 26. The first split beam 68 of the second laser beam 64 then travels through the first spherical lens 34 onto the recording spot 36 of the recording medium 38. The first spherical lens 34 transforms the first split beam 68 of the second laser beam 64 into a spherical wave beam source 60. The spherical wave beam source 60 constitutes the reference beam 60 for holographic reproduction. To obtain a reconstruction, the medium must be translated $\delta_B$ before the second laser beam 64 is emanated onto the recording medium 38. This will be discussed in detail below.

A diffracted beam 74 emanates from the recording medium 38 and is imaged through a third spherical lens 76 of focal length F, onto a plane of a detector 78. The detector 78 can be any suitable detector, for instance, an array of image pixels, such as a charge coupled device image detector. Thus, the reconstruction undergoes a wavelength change ($\lambda_1$ of first laser beam to $\lambda_2$ of second laser beam), a medium shift ($\delta_B$), and a second Fourier transform (by the third lens) forming the original image (inverted) on the detector 78. It should be noted that the distances between (a) the recording spot 36 in the recording medium 38 and the center of the third lens 76; and (b) the center of the third lens 76 and the plane of the detector 78 are each preferably the uniform displacement F.

Figure 3:
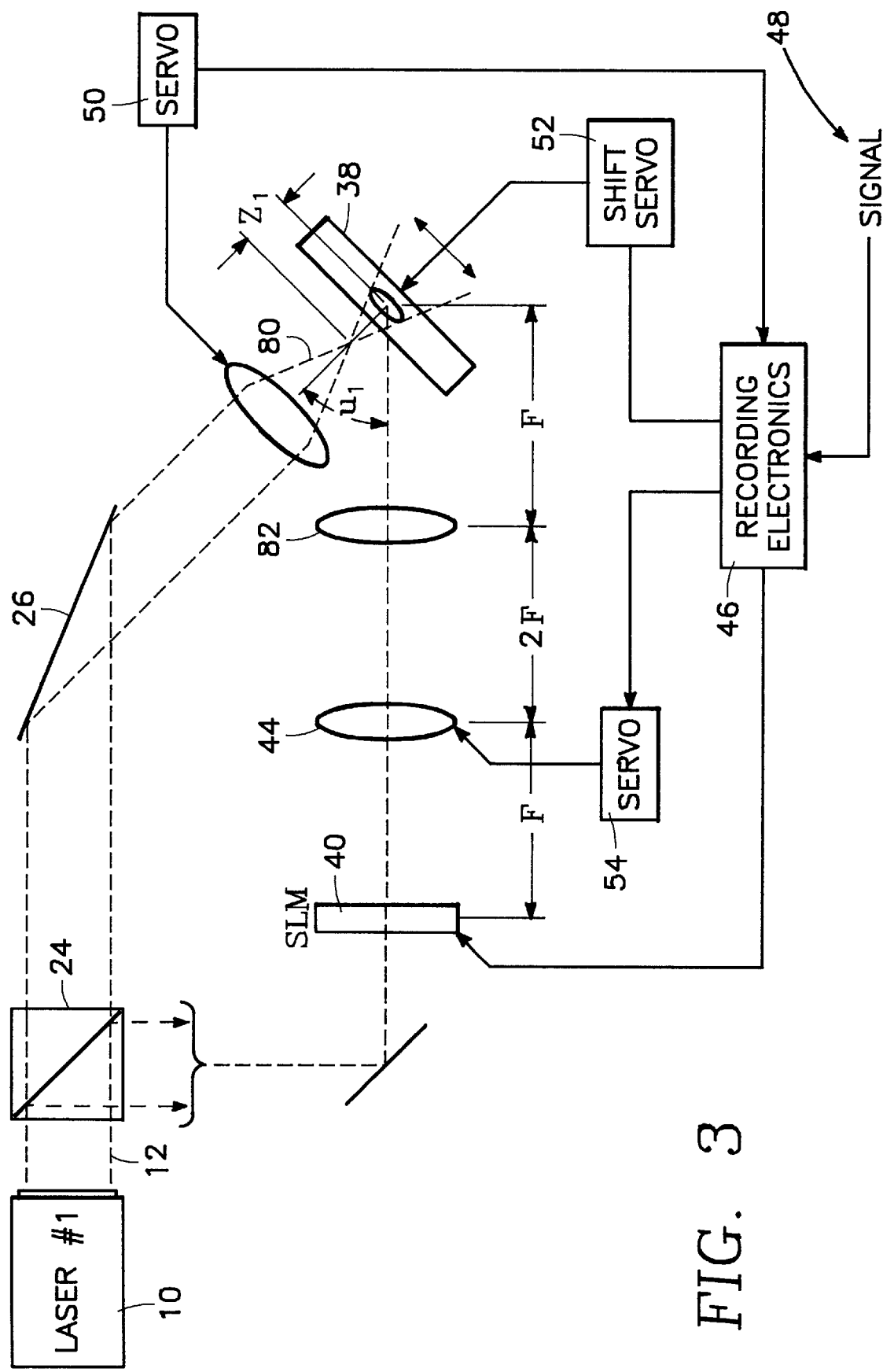
FIG. 3 is a schematic block diagram of a holographic storage system in recording mode in accordance with one embodiment of the invention employing Image plane geometry with a spherical wave as the reference beam.

The preceding descriptions of the present invention with reference to FIGS. 1 and 2 are pertinent to Fourier plane holography. Alternatively, imaging can be performed using an Image plane scheme. For example, FIG. 3 is a schematic block diagram of a holographic storage system in recording mode in accordance with one embodiment of the invention employing Image plane geometry with a spherical wave as the reference beam 80. The recording arrangement for Image plane holography is substantially similar to the arrangement of FIG. 1 with the exception that a fourth lens 82 is added between the second lens 44 and the recording medium 38. The fourth lens 82 has a focal length of F. Also, the center of the fourth lens 82 is 2F from the center of the second lens 44 and F from the center of the recording medium 38.

Figure 4:
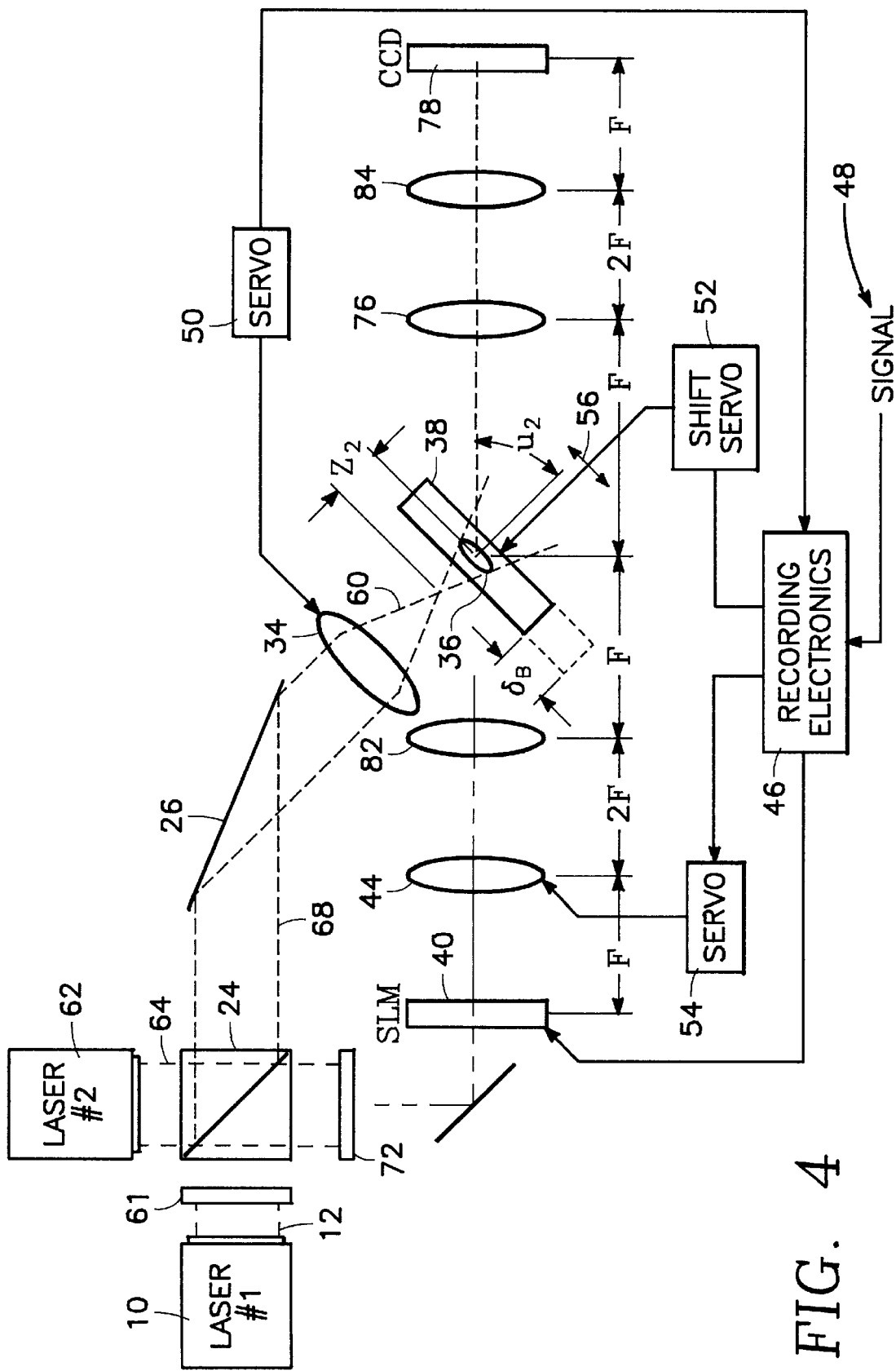
FIG. 4 is a schematic block diagram of a holographic storage system in reconstruction mode in accordance with one embodiment of the invention employing Image plane geometry with a spherical wave as the reference beam.

FIG. 4 is a schematic block diagram of a holographic storage system in reconstruction mode in accordance with one embodiment of the invention employing Image plane geometry with a spherical wave as the reference beam. The reconstruction arrangement is substantially similar to the arrangement of FIG. 2 with the exception that a fifth lens 84 with focal length F is added for imaging the reconstruction of holograms onto the detector 78. Specifically, the fifth lens 84 is added between the third lens 76 and the detector 78. The fifth lens 84 is a distance F from the detector 76 and 2F from the center of the third lens 76.

The reconstruction or read-out systems of FIGS. 2 and 4 utilize the second laser beam 64 (with wavelength $\lambda_2$) of the second laser 62. The second beam 64 preferably has a longer wavelength ($\lambda_2$) than the wavelength ($\lambda_1$) of the first laser beam 12 that was used for the recording systems of FIGS. 1 and 2. This is because at longer wavelengths the photorefractive sensitivity of the recording medium 38 is reduced, and hence erasure is avoided.

Figure 5:
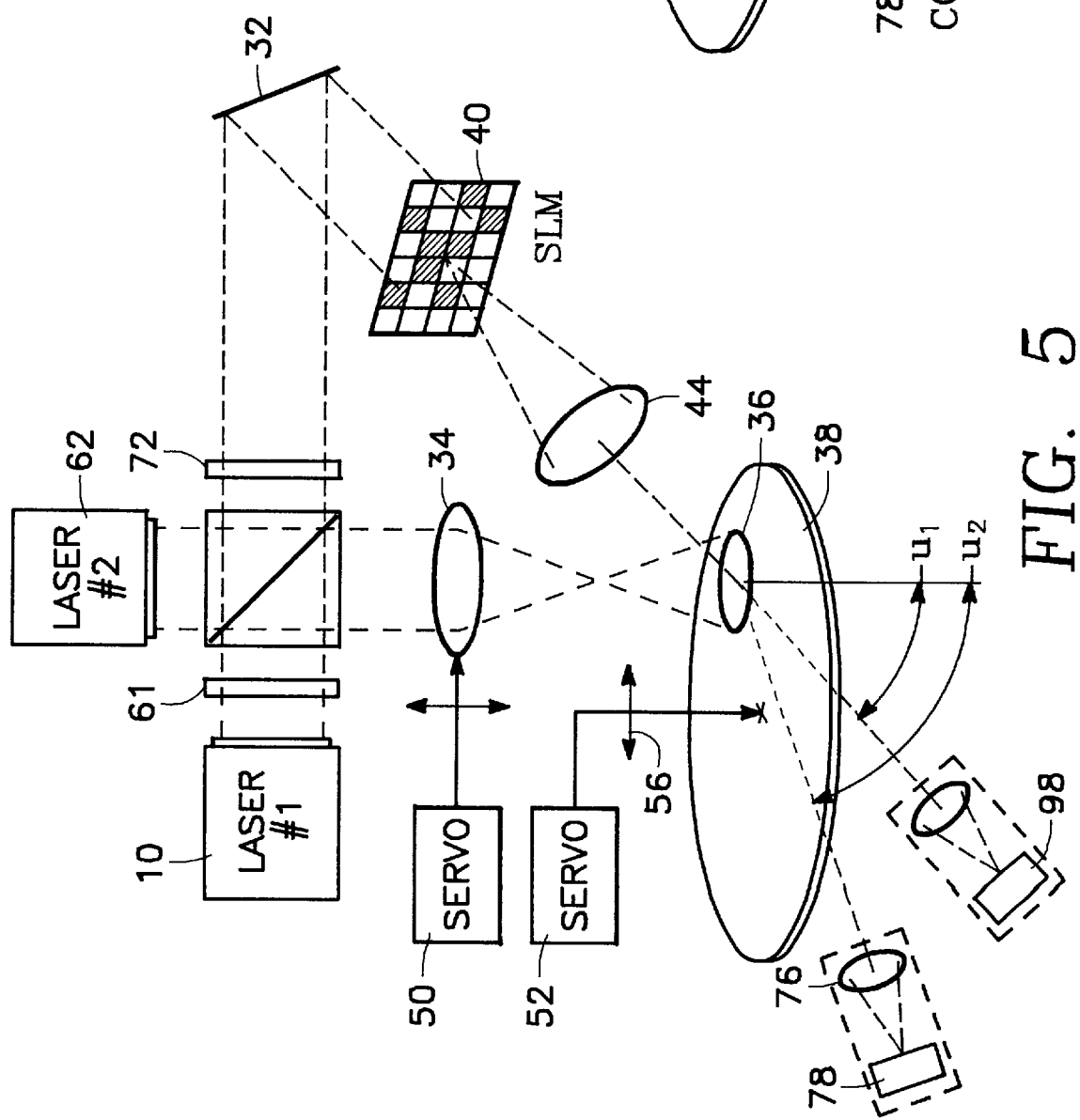
FIG. 5 is a diagram illustrating an embodiment of the invention of FIGS. 1–2 employing disk-shaped recording media for multiplexing in the along-track direction.

FIG. 5 is a perspective view illustrating an embodiment of the invention of FIGS. 1–2 employing disk-shaped recording media for multiplexing in the along-track direction. The shift multiplexing method is particularly well-suited for the implementation of holographic 3-D disks. A 3-D disk can be readily implemented with this method by simply using the disk rotation (which is already part of the system intended to allow accessing of information on different locations on the disk surface) in order to implement the shift. This simplifies the design of the head since no additional components are required for selective readout.

The disk medium 38 is rotated by the servo 52 under control of the recording electronics 46 of FIGS. 1–2. In addition to the detector 78 for reconstruction at wavelength $\lambda_2$, in the preferred embodiment, another third lens and detector 98 combination is used for reconstruction at wavelength $\lambda_1$. Alternatively, only one detector can be employed. For instance, detector 78 can be relocated from its original position to the position where detector 98 would be located to detect reconstruction at $\lambda_1$. Co-pending patent application Ser. No. 08/389,890, entitled HOLOGRAPHIC STORAGE USING SHIFT MULTIPLEXING, by Psaltis et al., describes shift multiplexing and detection using a single wavelength for both recording and readout.

Figure 6:
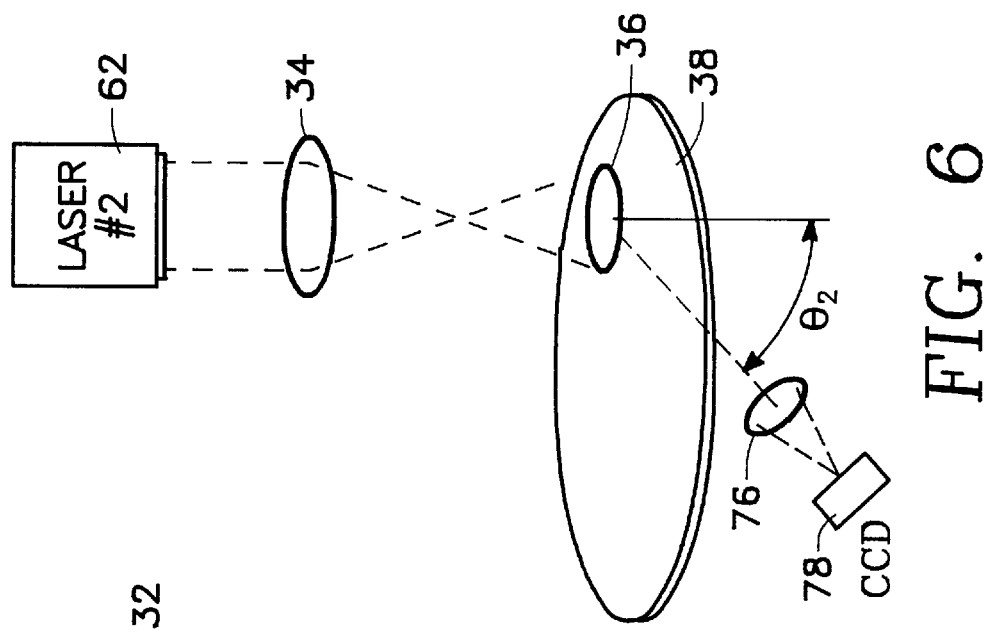
FIG. 6 is a diagram illustrating an alternative embodiment of the invention employing disk-shaped recording media for multiplexing in the along-track direction with only readout capabilities.

FIG. 6 is a diagram illustrating an alternative embodiment of the invention employing disk-shaped recording media for multiplexing in the along-track direction with only readout capabilities. For economical purposes, the system of FIG. 6 can be implemented with only reconstruction capabilities at wavelength $\lambda_2$. FIG. 6 is a simplified version of FIG. 5 and requires only the second laser 62, the first lens 34, the third lens 76, and the CCD detector 78 for reconstructing the hologram on the recording medium 38 at wavelength $\lambda_2$.

Figure 7:
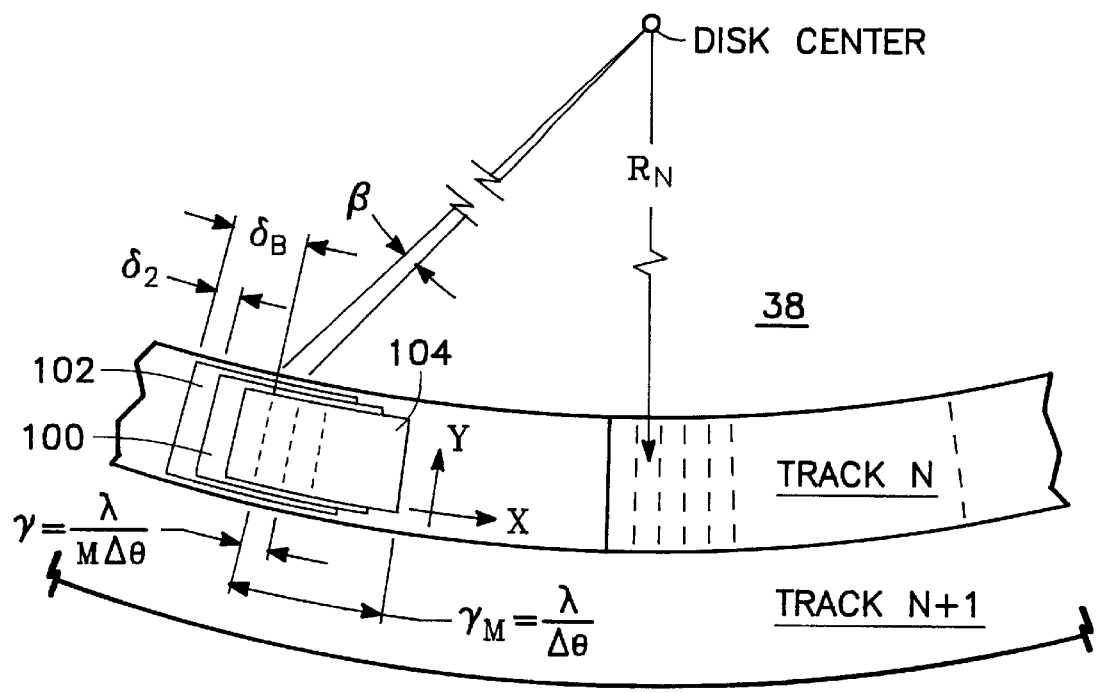
FIG. 7 is a diagram illustrating the placement of successive holograms on a disk media corresponding to FIG. 6.

FIG. 7 illustrates the placement of successive holograms within the recording medium 38. Referring to FIG. 7 along with FIG. 5, the recording medium 38 is an optical disk divided into plural longitudinal circular tracks labeled N, N+1, and so forth. In the embodiment of FIG. 7, adjacent tracks do not overlap but may be arbitrarily close together.

For recording, successive holograms 100, 102, 104 are recorded a distance of $\delta_2$ apart with the first laser beam source 12 having a wavelength of $\lambda_1$. For reconstruction or read-out, the first laser beam source 12 is blocked while the second beam source 64, having a wavelength of $\lambda_2$, emanates from the second laser 62 onto the disk 38. Before the second beam 64 emanates onto the disk 38, the disk 38 is rotated by the shift servo 52 to effectuate a distance on the track of $\delta_B$, with respect to where the first hologram 100 was recorded. The rotation of the disk 38 shifts the track and moves the first hologram 100 to a new location as indicated by the dashed lines the distance $\delta_B$. Thus, the holograms 100, 102, 104 previously recorded at wavelength $\lambda_1$ are reconstructed or read-out with the second beam 64 with wavelength $\lambda_2$ a distance $\delta_B$ from where the first set of holograms 100, 102, 104 were recorded by the first beam 12 with wavelength $\lambda_1$. The entire process is repeated with new holograms being recorded and reconstructed along the track N and successive tracks.

Preferably, the foregoing recording process is implemented by the shift servo 52 under the control of the recording electronics 46. Specifically, the recording electronics 46, which may comprise, for example, a programmed microprocessor, causes the servo 52 to rotate the disk 38 to a first position, at which time the recording electronics 46 causes the spatial light modulator 40 to produce a first image for recording on the disk 38.

Thereafter, the servo 52 rotates the disk 38 by the shift displacement $\delta_2$. Thereafter, the recording electronics 46 causes the spatial light modulator 40 to produce the next image for recording on the disk 38. The foregoing process is repeated until the necessary number of holograms have been recorded in this manner, at which time the recording electronics 46 causes the servo 52 to rotate the disk 38 by $\delta_B$ for reconstruction or read-out with the second laser beam 64. Once an entire track (for example track N) has been filled, the recording electronics 46 causes the servos 52 controlling optical elements in the paths of the reference and signal beams (such as the first lens 34 and the second lens 44) to move so as to radially move the beam spot at which the signal and reference beams intersect inside the disk 38 by the width of one track (i.e., by the width of one beam spot).

Figure 8:
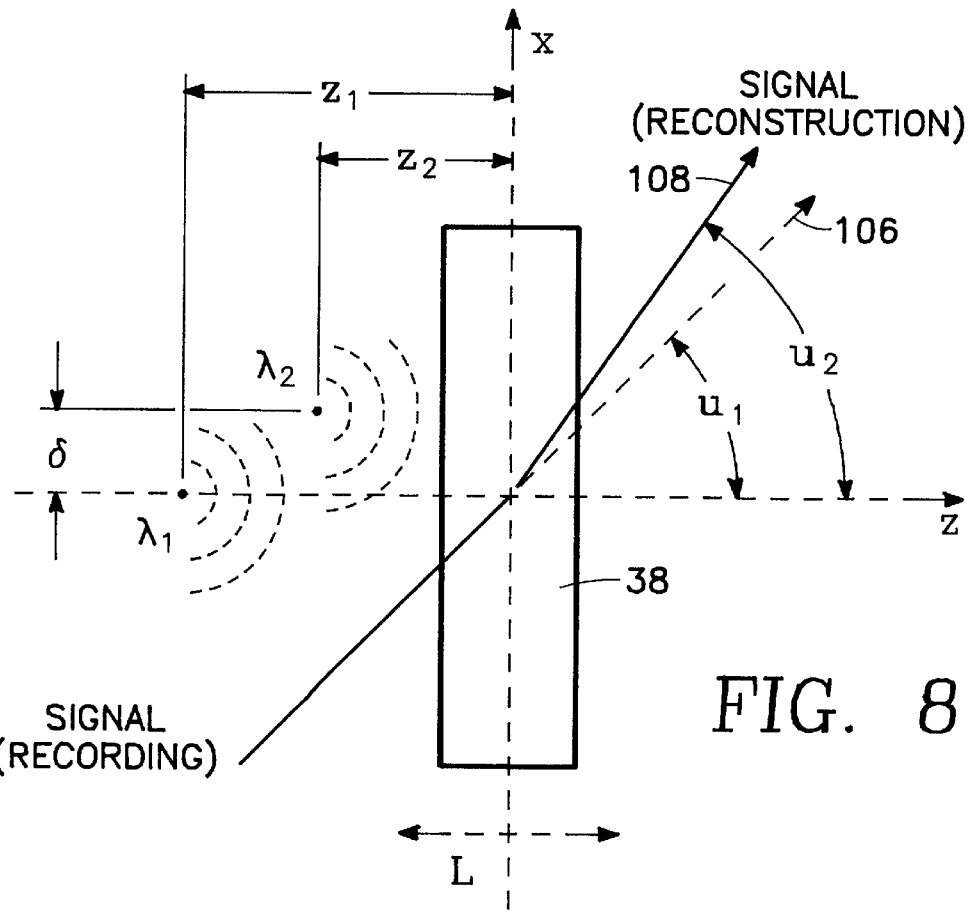
FIG. 8 is a diagram illustrating the geometry of the holographic storage system of FIGS. 1–4.

FIG. 8 is a diagram illustrating the geometry of the holographic storage system of FIGS. 1–4. Recording of the hologram is performed at wavelength $\lambda_1$ using a spherical reference wave originating a distance $z_1$ from the center of the recording material with respect to the optical z axis. A plane wave signal emanates onto the recording medium 38 and is incident at angle $\theta_1$, with respect to the optical z axis. The angle between the incident plane wave signal 106 and the spherical reference wave is denoted as $u_1$, where $u_1 \equiv \sin \theta_1 \ll 1$. Readout of the hologram is performed at wavelength $\lambda_2$ using a spherical wave originating distance $z_2$ from the center of the recording material with respect to the optical z axis. The diffraction angle is denoted as $\theta_2$, i.e., the direction where the reconstructed signal travels. The angle between the reconstructed signal 108 and the spherical reference wave is denoted as $u_2$, where $u_2 \equiv \sin \theta_2$.

Referring back to FIGS. 1–4 along with FIG. 8, if the first lens is located such that both recording 35 and readout beams 60, 80 are aligned with respect to it, then switching from a recording operation to a read-out (or vice versa) simply requires turning on the appropriate beam, turning off the other beam, and moving the first lens 34 in the z direction.

More specifically, the conditions required to obtain the reconstruction when changing the readout wavelength and the properties of the reconstruction are derived. In the following description the subscript 1 denotes quantities relevant to the recording at wavelength $\lambda_1$ and the subscript 2 denotes quantities for the read-out wavelength $\lambda_2$.

Consider the holographic material occupying the region $-\infty < x, y < +\infty$, $|z| < L/2$ and the recording reference beam being a spherical wave originating from the point $(0, 0, -z_1)$, given in the paraxial approximation by:

$$R_1(x, y, z) = \frac{1}{j\lambda_1(z_1+z)} \exp\left\{ j\frac{2\pi}{\lambda_1}\left[ (z_1+z) + \frac{x^2+y^2}{2(z_1+z)} \right] \right\} \quad (1)$$

The signal is a plane wave 106 propagating at angle $u_1 \ll 1$ with respect to the z-axis, $$S_1(x, z) = \exp\left\{ j\frac{2\pi}{\lambda_1}\left[ u_1 x + \left(1 - \frac{u_1^2}{2}\right) z \right] \right\} \quad (2)$$

The readout spherical reference originates at $(\delta 0, -z_2)$, hence $$R_2(x, y, z) = \frac{1}{j\lambda_2(z_2+z)} \exp\left\{ j\frac{2\pi}{\lambda_2}\left[ (z_2+z) + \frac{(x-\delta)^2+y^2}{2(z_2+z)} \right] \right\} \quad (3)$$

The diffracted field $E_2$, under the Born, paraxial, and constant modulation depth approximations, is given by the following integral:

$$E_2(x_p, y_p, z_p) = \quad (4)$$

$$\int_{-\infty}^{+\infty} \int_{-\infty}^{+\infty} \int_{-L/2}^{+L/2} R_1^*(x,y,z) S_1(x,z) R_2(x,y,z) \times \frac{1}{j\lambda_2(z_p-z)}$$

$$\exp\left\{ j\frac{2\pi}{\lambda_2}\left[ (z_p+z) + \frac{(x_p-x)^2+(y_p-y)^2}{2(z_p-z)} \right] \right\} dz\,dy\,dx$$

The reconstruction is a plane wave if the following condition is satisfied:

$$\lambda_1 z_1 = \lambda_2 z_2 \quad (5)$$

Thus, from eq. 5, there is a different axial distance between the reference beam of the second wavelength $\lambda_2$ and the recording medium equal to $z_2$ in order to focus reconstruction.

The change in focal distance compensates for the curvature mismatch between the recording and readout reference wavefronts. Using eq. 5, the integral in eq. 4 is calculated as:

$$E_2(x_p, y_p, z_p) = \frac{1}{(\lambda_1 z_1)^2} \exp\left\{ j 2\pi \left( \frac{z_2}{\lambda_2} - \frac{z_1}{\lambda_1} \right) \right\} \times \quad (6)$$

$$\exp\left\{ j\frac{2\pi}{\lambda_2}\left[ \frac{\lambda_2}{\lambda_1} u_1 x_p + \left(1 - \frac{1}{2} u_1^2 \frac{\lambda_2^2}{\lambda_1^2}\right) z_p \right] \right\} \times$$

$$\mathrm{sinc}\left\{ \frac{u_1 L \delta}{\lambda_1 z_2} - \frac{1}{2} u_1^2 \left( \frac{\lambda_2}{\lambda_1} - 1 \right) \frac{L}{\lambda_1} \right\}$$

where $\mathrm{sinc}(\alpha) = \sin(\pi\alpha)/(\pi\alpha)$.

From eq. 6 we draw the following conclusions for the reconstruction at the readout wavelength $\lambda_2$: First, the reconstruction propagates at angle $u_2$ satisfying (in the paraxial approximation) the condition:

$$\frac{u_2}{u_1} = \frac{\lambda_2}{\lambda_1} \quad (7)$$

Thus, from eq. 7, a second detector 98, as shown in FIG. 5, can be employed at a location so that the propagation angle is equal to $u_1$. Alternatively, detector 78 can be relocated according to eq. 7 to detect reconstruction at $\lambda_1$.

Second, in order to Bragg match the hologram at the readout wavelength, the argument to the sinc function in eq. 2 must be zero. Solving for a shift selectivity, $\delta_B$, we find the required translation of the hologram relative to the reference:

$$\delta_B = \frac{1}{2}\left( \frac{\lambda_2}{\lambda_1} - 1 \right) u_1 z_2 \quad (8)$$

Thus, from eq. 8, there is a relative transverse displacement between the reference beam and the recording medium equal to $\delta_B$ in order to Bragg match.

Third, the Bragg selectivity, $\delta_2$ (see FIG. 8) at wavelength $\lambda_2$, is found by replacing $\delta = \delta_B \pm \delta_2$ the argument to the sinc function of eq. 2 and setting the argument equal to ±1. The result is:

$$\delta_2 = \frac{\lambda_2 z_2}{u_2 L} = \frac{\lambda_1}{\lambda_2} \delta_1 \qquad (9)$$

where $\delta_1 = \lambda_1 z_1/(u_1 L)$ is the shift selectivity in the recording wavelength. It should be noted that if $\lambda_2 > \lambda_1$, then $\delta_2$ is smaller than $\delta_1$. Since the holograms are recorded at $\delta_2$ apart, packing is more dense compared to the case when read-out is intended to at wavelength $\lambda_1$.

Fourth, consider the case when the signal beam is not a single plane wave, but instead it occupies a finite angular bandwidth around the carrier $u_{1c}$. Then, for each spatial frequency, eq. 8 yields a different required $\delta_B$, which means that the complete hologram cannot be Bragg matched at the same time. To find the limiting angular range $\Delta u_2$ of the reconstruction, we assume that $\delta_B$ is chosen such that the central signal component $u_{2c} = u_{1c} \lambda_2/\lambda_1$ is Bragg matched. We then find that the reconstruction vanishes for $$\Delta u_2 = \pm \frac{2\lambda_1}{\left(\frac{\lambda_2}{\lambda_1} - 1\right) u_{1c} L} \qquad (10)$$

where $\Delta u_2$ determines the space bandwidth product of the reconstructed hologram in the x direction. Thus for Fourier transform holograms a slice of size $\Delta x = 2\Delta u_2 F$ (where F is the focal length of the lens used for the Fourier transformation) is reconstructed.

The foregoing analysis ignored refraction and dispersion effects, and also the finite numerical apertures $(NA)_1$, $(NA)_2$ of the spherical waves. The formulas including these effects are given Table 1.

TABLE 1

Bragg selectivity

| | |
|---|---|
| $\delta_1$ | $\dfrac{\lambda_1'[n_1 z_1' - (n_1 - 1)L/2]}{u_1' L} + \dfrac{\lambda_1'}{2(NA)_1}$ |
| $\delta_2$ | $\dfrac{\lambda_2'[n_2 z_2' - (n_2 - 1)L/2]}{u_2' L} + \dfrac{\lambda_2'}{2(NA)_2}$ |
| Focusing condition | $\lambda_1'\left(z_1' - \left(1 - \dfrac{1}{n_1}\right)\dfrac{L}{2}\right) =$ $\lambda_2'\left(z_2' - \left(1 - \dfrac{1}{n_2}\right)\dfrac{L}{2}\right)$ |
| Bragg-matching condition $\delta_B$ | $\dfrac{1}{2}\left(\dfrac{n_1 \lambda_2'}{n_2 \lambda_2'} - 1\right)\dfrac{u_1'}{n_1} \times$ $\left[n_2 z_2' - (n_2 - 1)\dfrac{L}{2}\right] + \dfrac{\lambda_2'}{2(NA)_2}$ |
| Reconstructed band $\Delta u_2$ | $\dfrac{\lambda_1'}{\left(\dfrac{n_1 \lambda_2'}{n_2 \lambda_2'} - 1\right) u_{1c}' L}$ |

In Table 1, primed quantities are measured in air, and $n_1$, $n_2$ are the refractive indices at wavelengths $\lambda_1$, $\lambda_2$, respectively. The effective numerical aperture $(NA)_2$ is in general smaller than $(NA)_1$ because of the required shift $\delta B$ and edge discontinuity effects. Numerical aperture reduction can be avoided if readout is performed with a spherical wave of numerical aperture higher than that used for recording.

Figure 10:
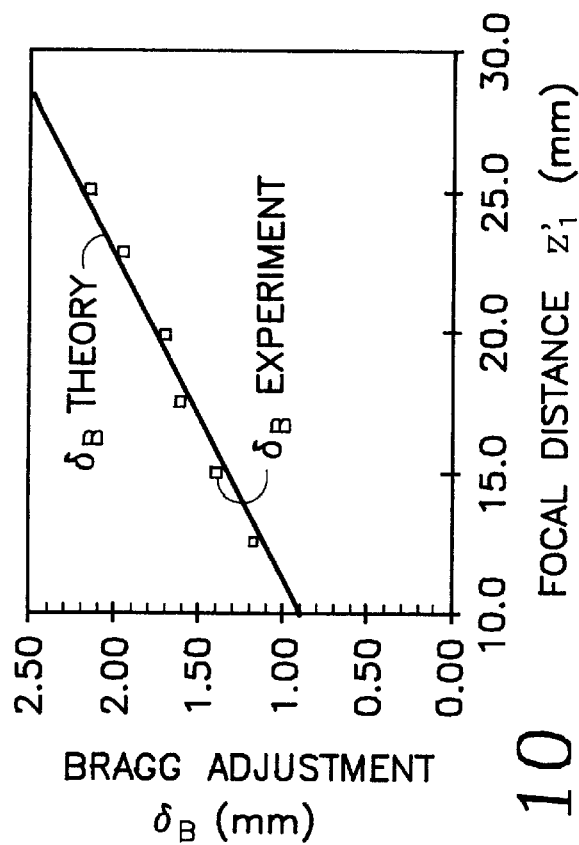
FIG. 10 is a graph illustrating a comparison between Bragg adjustment and focal distances.
Figure 9:
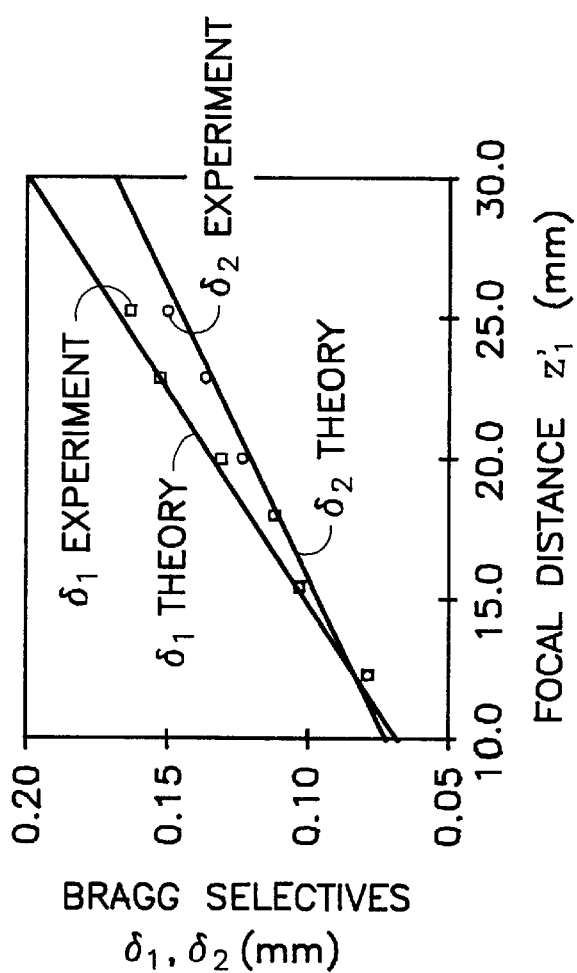
FIG. 9 is a graph illustrating a comparison between Bragg selectivities and focal distances.

FIG. 9 is a graph illustrating a comparison between theory and experiment for the Bragg selectivities. The experiment was conducted using an Ar laser at $\lambda_1 = 488$ nm to record the hologram and a HeNe laser at $\lambda_2 = 633$ nm to reconstruct the holograms. At each recording, the condition of eq. 8 was observed. The recording material was $LibO_3$ (lithium niobate) with thickness L=250 μm. FIG. 10 is a graph illustrating a comparison between Bragg adjustment and focal distances.

Figure 11:
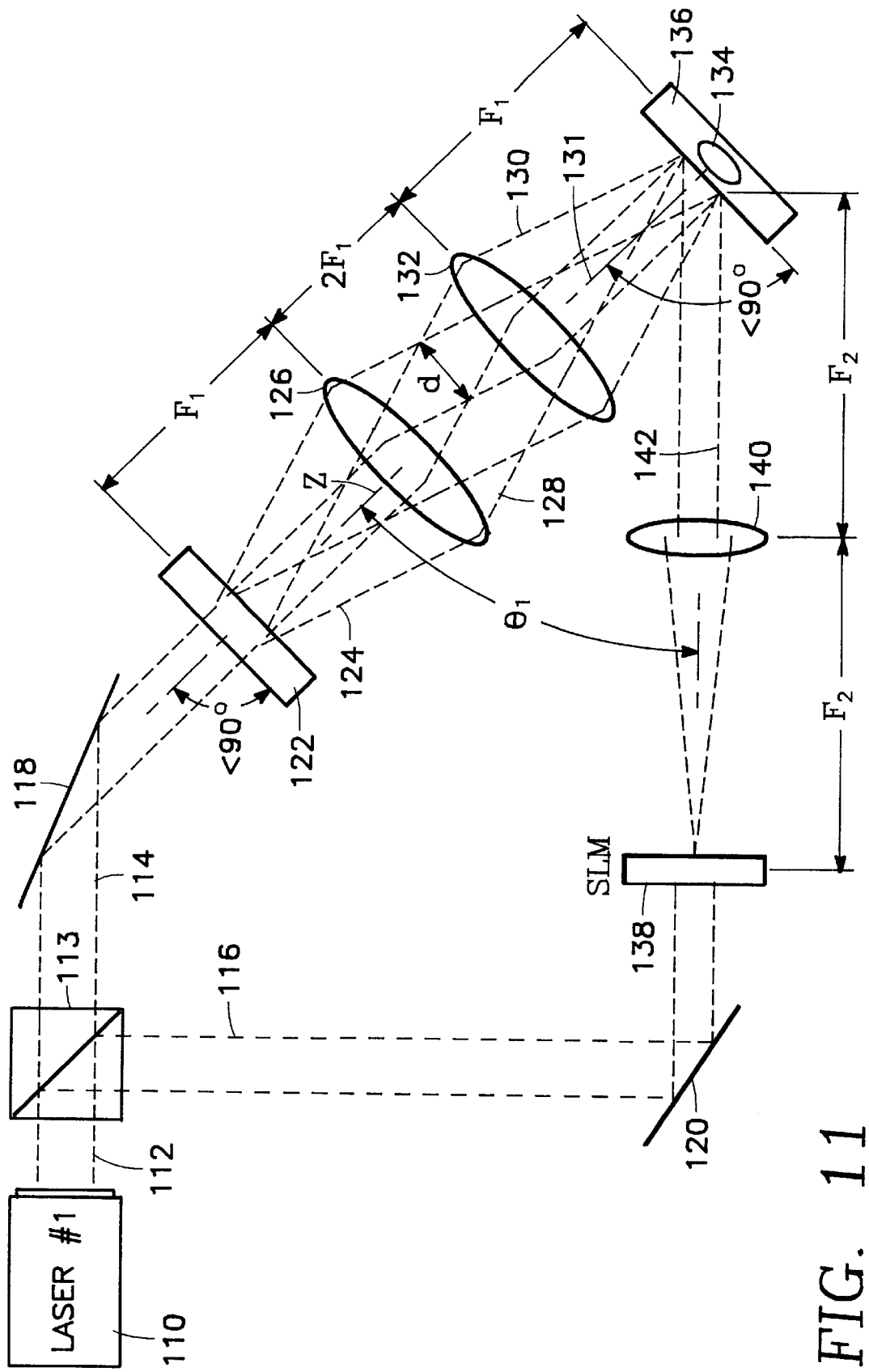
FIG. 11 is a schematic block diagram of a holographic storage system in recording mode in accordance with one embodiment of the invention employing Fourier plane geometry with multiple plane waves as the reference beam.

Alternatively, shift multiplexing can be performed using a fan of M plane waves, instead of a spherical wave as discussed above, in the reference beam. FIG. 11 is a schematic block diagram of a holographic storage system in recording mode in accordance with one embodiment of the invention employing Fourier plane geometry with multiple plane waves as the reference beam. A first laser 110 furnishes a first laser beam 112 with wavelength $\lambda_1$ to a beam splitter 113. The beam splitter 113 splits the first laser beam 112 into a first split beam 114 and a second split beam 116 between a first mirror 118 and a second mirror 120, respectively.

Figure 20:
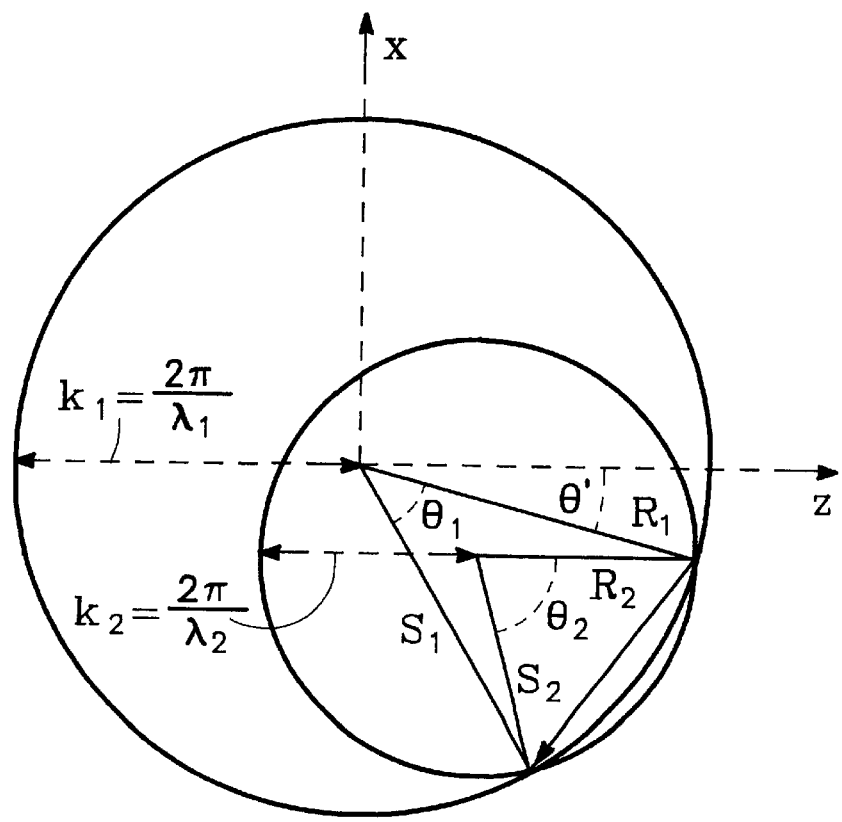
FIG. 20 is a diagram illustrating the geometry of the holographic storage system of FIGS. 11–14.

The first split beam 114 is reflected off the first mirror 118 to a diffractive element 122 which produces an array of M plane waves 124. The first split beam 114 is preferably incident on the diffractive element 122 at an angle less than 90 degrees. For simplicity, only three beams are shown in FIG. 11. The M plane waves are then Fourier transformed by a first spherical lens 126 into M beam sources 128 separated by uniform distances d. The light from the array of M beam sources 128 is transformed into a one-dimensional fan of M plane waves 130 with a central component 131 by a second spherical lens 132. The fan of M plane waves 130 constitutes the reference beam 130 for holographic recording and reproduction. The angle of incidence of the central component 131 of the reference beam 130 during recording is preferably less than 90 degrees, in accordance with the geometry of FIGS. 11–14, as shown in FIG. 20.

The diffractive element 122, in one implementation, is a Dammann grating of the type disclosed in Dammann et al., "High Efficiency In-Line Multiple Imaging by Means of Multiple Phase Holograms," *Optics Communications*, Vol. 3, No. 5 pages 312–315 (July 1971). However, in another implementation, the diffractive element 122 is a hologram with similar properties. The first spherical lens 126 has focal length F and the second spherical lens 132 have focal length F. The first spherical lens 126 is preferably spaced apart a distance 2F from the second spherical lens 132. The second spherical lens 132 images the reference beam 130 emanating from the diffractive element 122 onto a recording spot 134 in an optical recording medium 136. The optical recording medium 136 is a relatively insensitive photosensitive material, such as a photorefractive crystal, e.g., $LiNbO_3$ (lithium niobate) or SBN (strontium barium niobate).

The second split beam 116 of the first laser beam 112 is diverted to the second mirror 120, modulated by a spatial light modulator 138, and then furnished to a third spherical lens 140 to provide a signal beam 142 for recording a hologram in the optical recording medium 136. The signal beam 142 is Fourier transformed by the third spherical lens 140 of focal length F, onto the same recording spot 134 in the recording medium 136 that is illuminated by the reference beam 130. As indicated in FIG. 11, the distance between the spatial light modulator 138 and the center of the third spherical lens 140 is F. In addition, the distance between the center of the third spherical lens 140 and the plane of the recording medium 136 is preferably F.

During recording of a hologram in the medium, recording electronics (not shown) and servos (not shown), similar to the types described in FIGS. 1–4, control the components in FIG. 9 in a similar manner as described in FIGS. 1–4.

Figure 12:
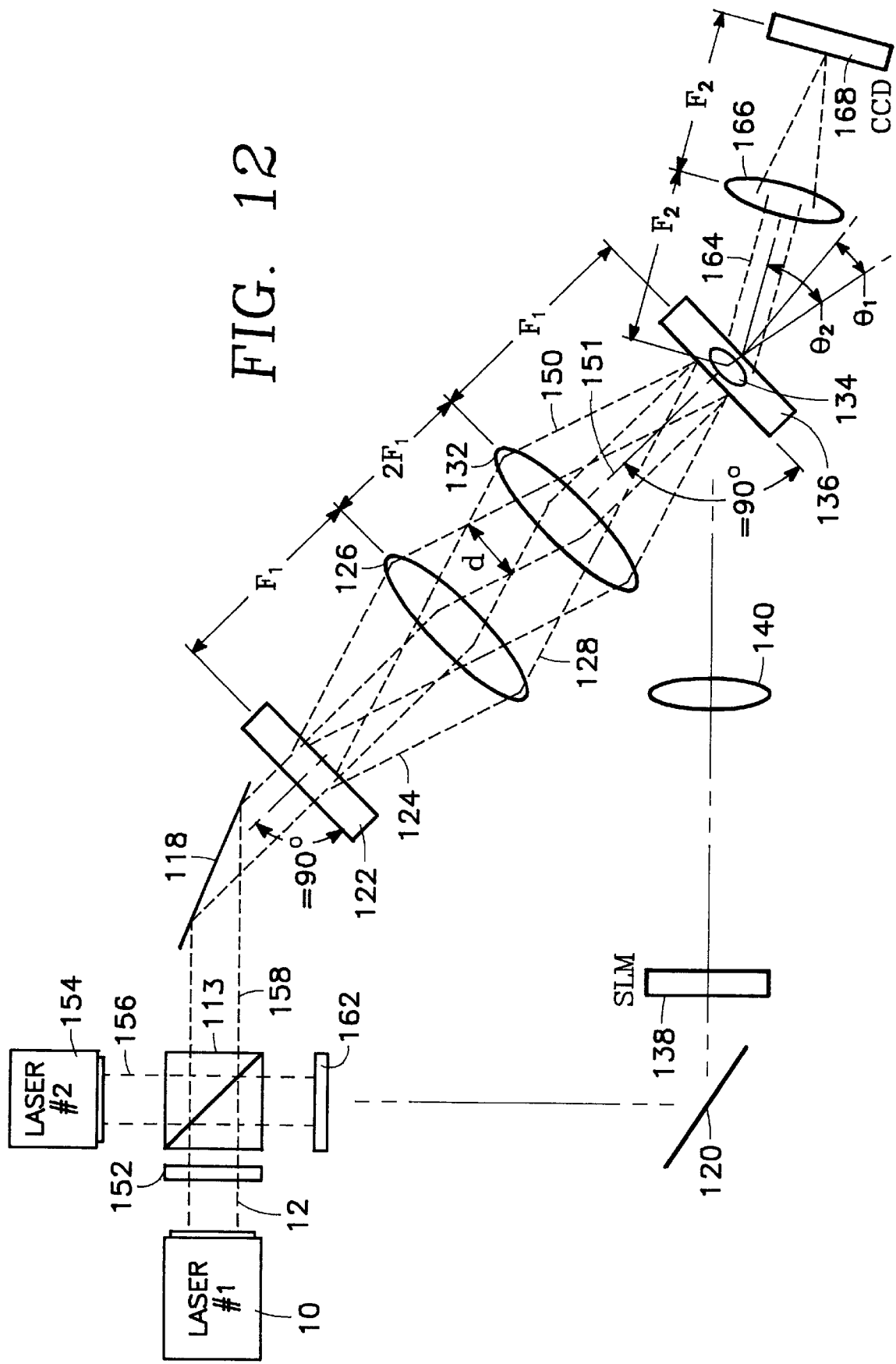
FIG. 12 is a schematic block diagram of a holographic storage system in reconstruction mode in accordance with one embodiment of the invention employing Fourier plane geometry with multiple plane waves as the reference beam.

FIG. 12 is a schematic block diagram of a holographic storage system in reconstruction mode in accordance with one embodiment of the invention employing Fourier plane geometry with multiple plane waves as the reference beam. For reconstruction of a hologram previously recorded in the recording medium 136 of FIG. 11, the first split beam 114 is preferably normally incident (at an angle equal to 90 degrees) on the diffractive element 122. Also, a reference beam 150 with a central component 151 is applied to the recording spot 134 of the recording medium 136. The first laser beam 112 of the laser 110 is blocked by a shutter 152. As a result, the signal beam 142 of FIG. 9 is not produced.

A second laser 154 furnishes a second laser beam 156 with wavelength $\lambda_2$ to the beam splitter 113. The beam splitter 113 splits the second laser beam 156 into a first split beam 158 and a second split beam 160. However, the second split beam 160 of the second laser beam 156 is blocked by a second shutter 162. The first split beam 158 of the second laser beam 154 is diverted to the first mirror 118. The first split beam 158 is reflected off the first mirror 118 to the diffractive element 122 which produces an array of M plane waves 124. The M plane waves 124 are then Fourier transformed by the first spherical lens 126 into M beam sources 128 separated by uniform distances d. The light from the array of M beam sources 128 is transformed into a one-dimensional fan of M plane waves 150 by the second spherical lens 132. The fan of M plane waves 150 constitutes the reference beam 150 for holographic reconstruction or readout. The central component 151 of the reference fan 150 must be normally incident on the holographic material 136 for proper readout, in accordance with the geometry of FIGS. 11–14, as shown in FIG. 20.

Similar to the arrangement of FIGS. 1–4, a new hologram is recorded after shifting the recording medium 136 by $\delta_B$. The shift method is convenient in the 3D holographic disk configuration (discussed in detail in FIG. 15), since disk rotation produces the required relative shift. An important difference, however, is that the Bragg matching condition in this case is achieved by changing the tilt of the reference fan, whereas in the case of spherical reference waves (FIGS. 1–4) a translation by $\delta_B$ was required.

A diffracted beam 164 emanates from the recording medium 136 and is imaged through a fourth spherical lens 166 of focal length F, onto a plane of a detector 168. Thus, the reconstruction undergoes a wavelength change ($\lambda_1$ of first laser beam to $\lambda_2$ of second laser beam), a medium shift ($\delta_B$), and a second Fourier transform (by the fourth lens) forming the original image (inverted) on the CCD sensor. It should be noted that the distances between (a) the recording spot 134 in the recording medium 136 and the center of the fourth lens 166; and (b) the center of the fourth lens 166 and the plane of the detector 168 are each preferably the uniform displacement F. Similar to the detector of FIGS. 2 and 4, the detector 168 may be an array of image pixels such as a charge coupled device image detector.

Referring to FIG. 11, the reference beam 150 originates from the array 128 of M beam sources located in the front focal plane of the first lens 126, and centered around the optical axis z. The first lens 126 transforms the field into the fan 150 of M plane waves. The angular separation is uniform, given by $\Delta\theta \approx d/F$, where d is the distance between successive point sources and $F_r$ is the focal length. Thus the angle of incidence of the m-th component is:

$$\theta_m \approx \left(m - \frac{M-1}{2}\right)\Delta\theta + \theta \quad m = 0, \ldots, M-1 \qquad (14)$$

where θ' is given by eq. 15 below. The signal beam 142 will have more than one angular component because of the modulation imposed by the spatial light modulator 138. Because the reference consists of M plane waves, the recorded image may be thought of as consisting of M separate holograms recorded simultaneously with the same signal beam.

Figure 13:
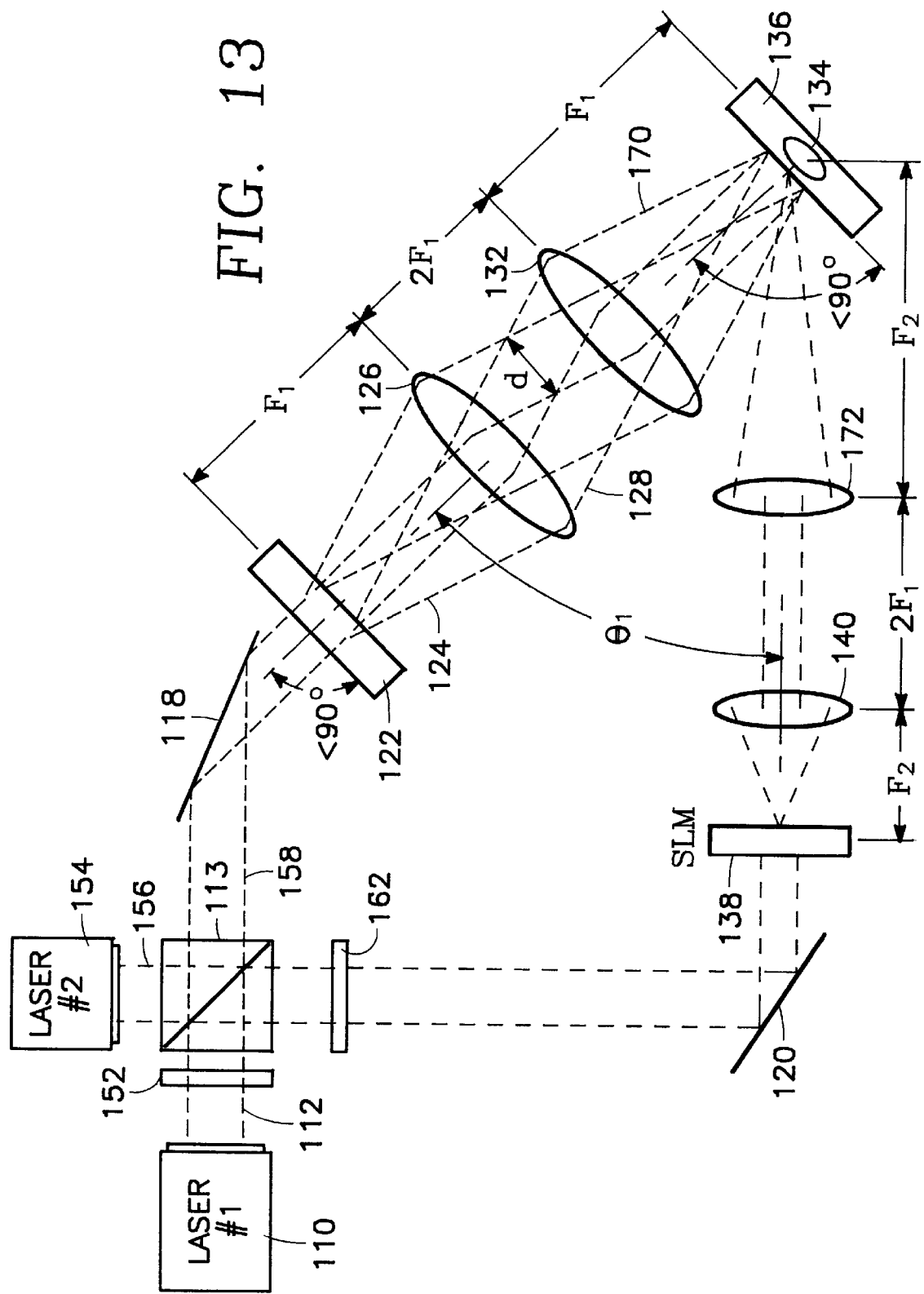
FIG. 13 is a schematic block diagram of a holographic storage system in recording mode in accordance with one embodiment of the invention employing Image plane geometry with multiple plane waves as the reference beam.

The preceding descriptions of the present invention with reference to FIGS. 11 and 12 are pertinent to Fourier plane holography. Alternatively, storage can be performed using an Image plane scheme. For example, FIG. 13 is a schematic block diagram of a holographic storage system in recording mode in accordance with one embodiment of the invention employing Image plane geometry with multiple plane waves as a reference beam 170. The recording arrangement for Image plane holography is substantially similar to the arrangement of FIG. 11 with the exception that a fifth lens 172 is added between the third lens 140 and the recording medium 136. The fifth lens 172 has a focal length of F. Also, the center of the fifth lens 142 is 2F from the center of the third lens 140 and F from the center of the recording medium 136.

Figure 14:
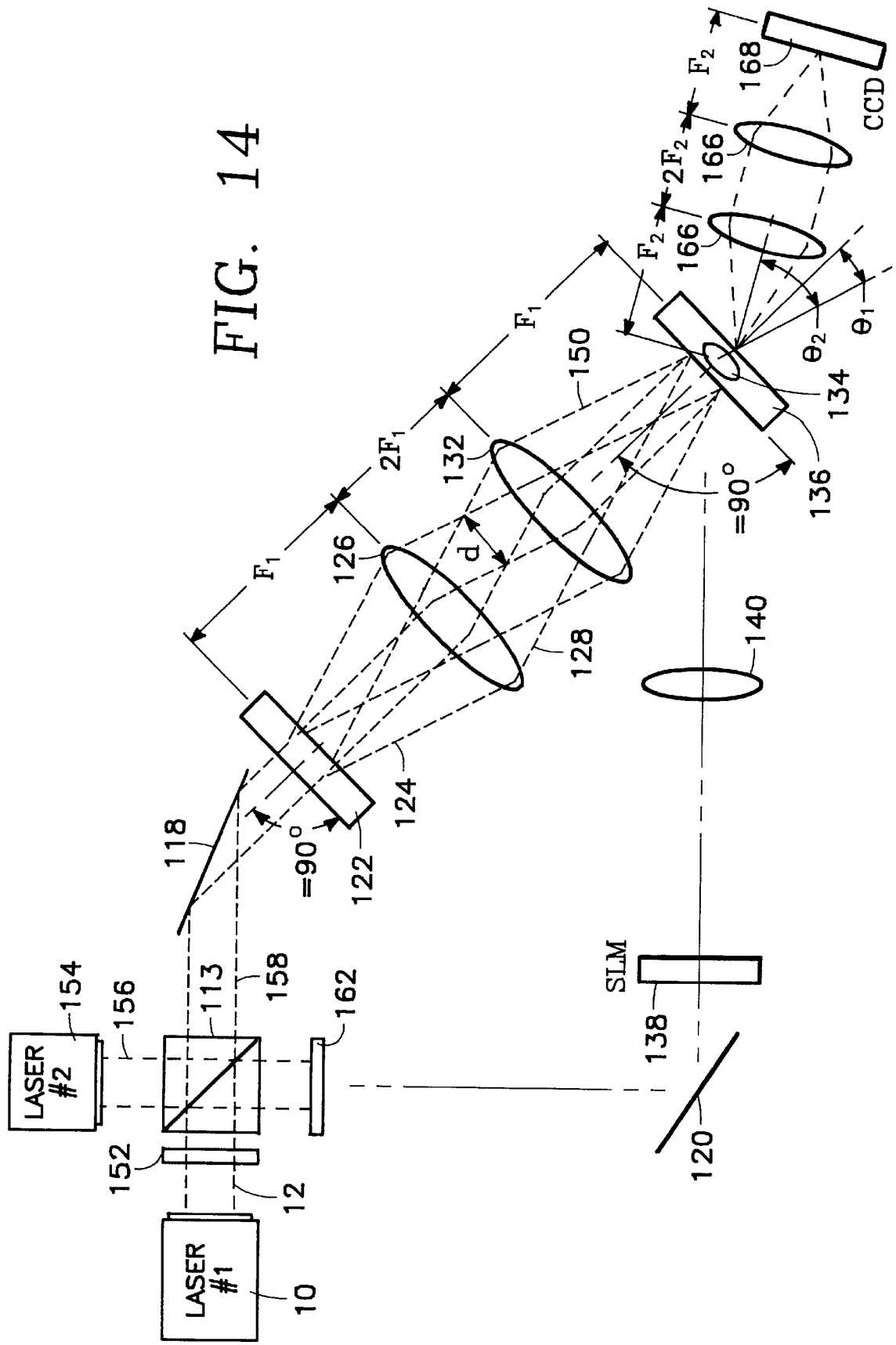
FIG. 14 is a schematic block diagram of a holographic storage system in reconstruction mode in accordance with one embodiment of the invention employing Image plane geometry with multiple plane waves as the reference beam.

FIG. 14 is a schematic block diagram of a holographic storage system in reconstruction mode in accordance with one embodiment of the invention employing Image plane geometry with multiple plane waves as the reference beam. The reconstruction arrangement is substantially similar to the arrangement of FIG. 12 with the exception that a sixth lens 174 with focal length F is added for imaging the reconstruction of holograms onto the CCD detector 168. Specifically, the fifth lens 174 is added between the fourth lens 166 and the CCD detector 168. The sixth lens 174 is a distance F from the detector 168 and 2F from the center of the fourth lens 166. Similar to the reconstruction or read-out systems of FIGS. 2 and 4, the reconstruction or read-out systems of FIGS. 12 and 14 utilize a second laser beam 156 with a longer wavelength ($\lambda_2$) than the wavelength ($\lambda_1$) of the first laser beam 112 for similar reasons.

Figure 15:
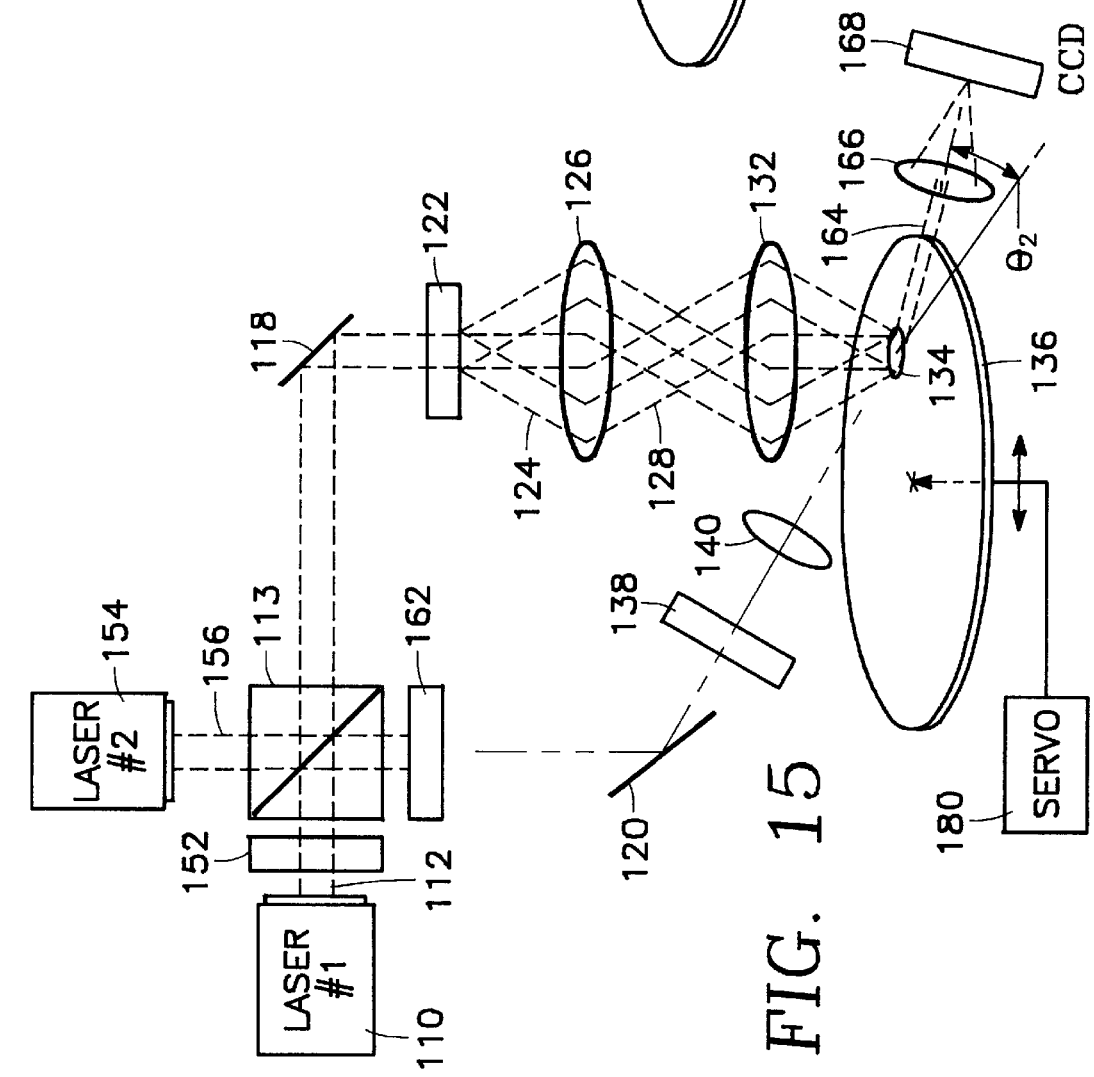
FIG. 15 is a diagram illustrating an embodiment of the invention of FIGS. 11–12 employing disk-shaped recording media for multiplexing in the along-track direction.

FIG. 15 is a diagram illustrating an embodiment of the invention of FIGS. 9–10 employing disk-shaped recording media for multiplexing in the along-track direction, similar to the arrangement of FIG. 5. FIG. 15 illustrates a perspective view of how the embodiment of FIGS. 9–10 are implemented in accordance with the foregoing using a disk medium 136 rotated by a servo 180.

Figure 16:
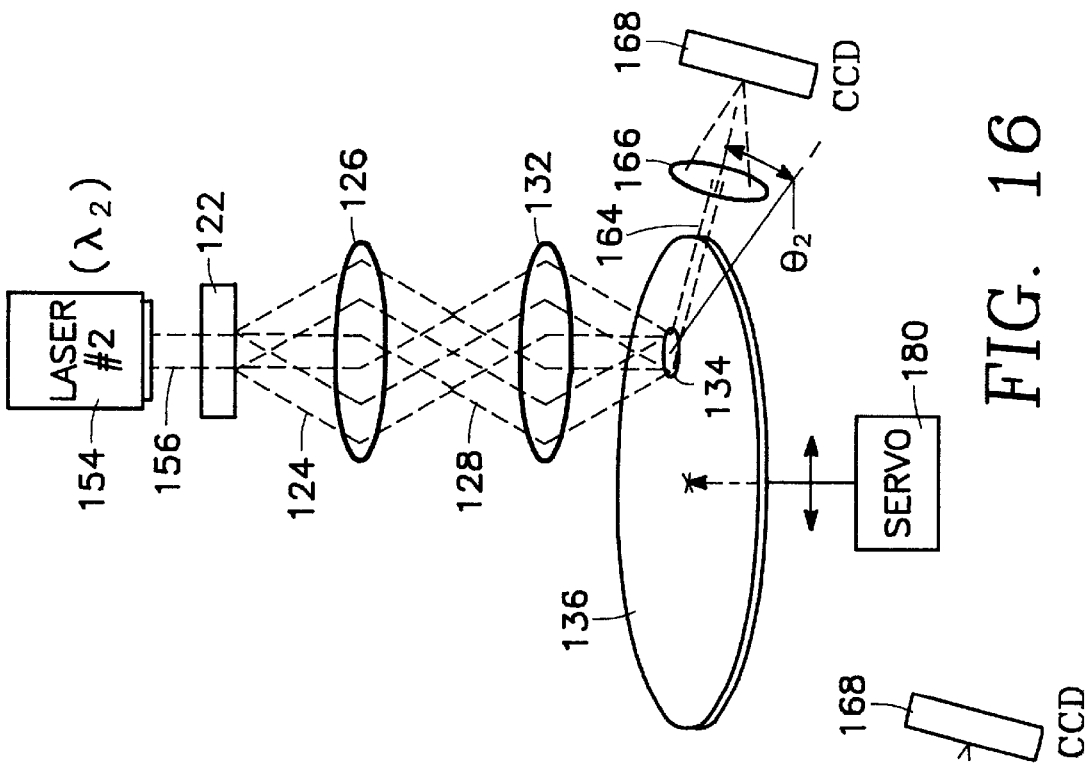
FIG. 16 is a diagram illustrating an alternative embodiment of the invention employing disk-shaped recording media for multiplexing in the along-track direction with only readout capabilities.

FIG. 16 is a diagram illustrating an alternative embodiment of the invention employing disk-shaped recording media for multiplexing in the along-track direction with only readout capabilities, similar to the arrangement of FIG. 6. For economical purposes, the system of FIG. 16 can be implemented with only reconstruction capabilities at wavelength $\lambda_2$. FIG. 16 is a simplified version of FIG. 15 and requires only the second laser 154, the first lens 126, the second lens 132, the fourth lens 164, and the CCD detector 168 for reconstructing the hologram on the recording medium 136 at wavelength $\lambda_2$.

Figure 17:
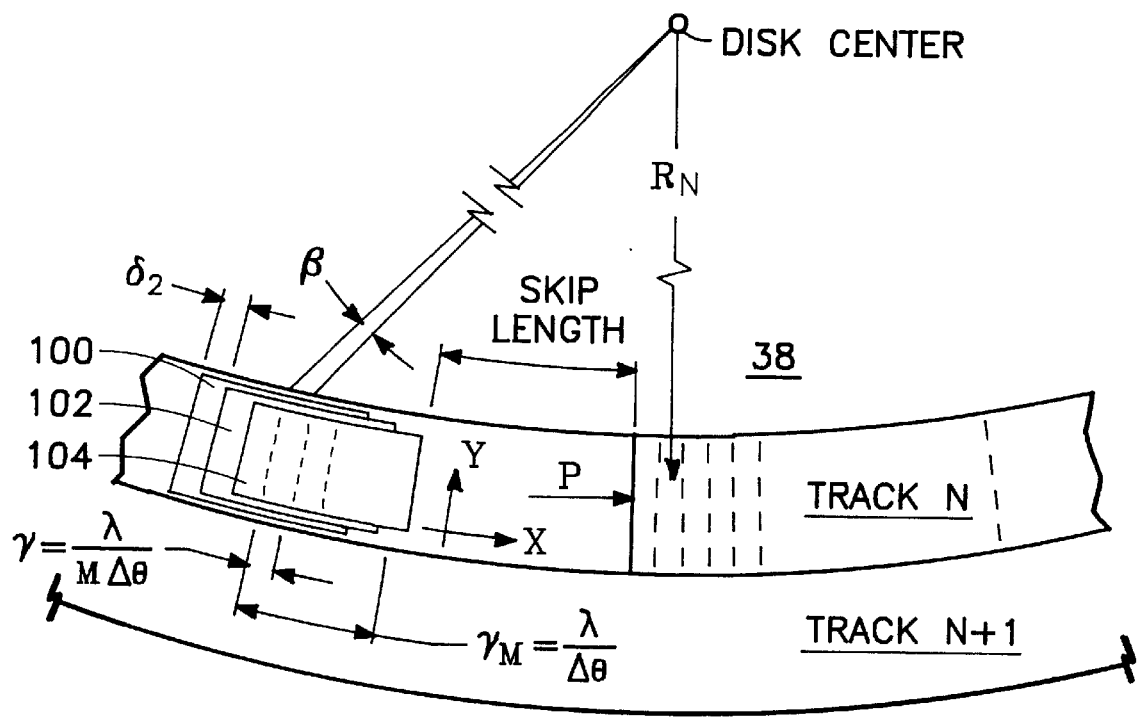
FIG. 17 is a diagram illustrating the placement of successive holograms on a disk media corresponding to FIGS. 11–12.

FIG. 17 is a diagram illustrating the placement of successive holograms on a disk media corresponding to FIGS. 9–10. The disk in FIG. 17 operates in substantially the same manner as FIG. 8 with the exception of a skip length. The skip length is the distance the disk is rotated after recording successive holograms. The skip length is the length $L_h$ of one hologram (as measured in the plane of the surface of the disk) minus the number of holograms recorded multiplied by the shift displacement between successive. In this way, no spot along the entire length of the track has more than a particular number of holograms multiplexed along the x-direction.

Figure 18:
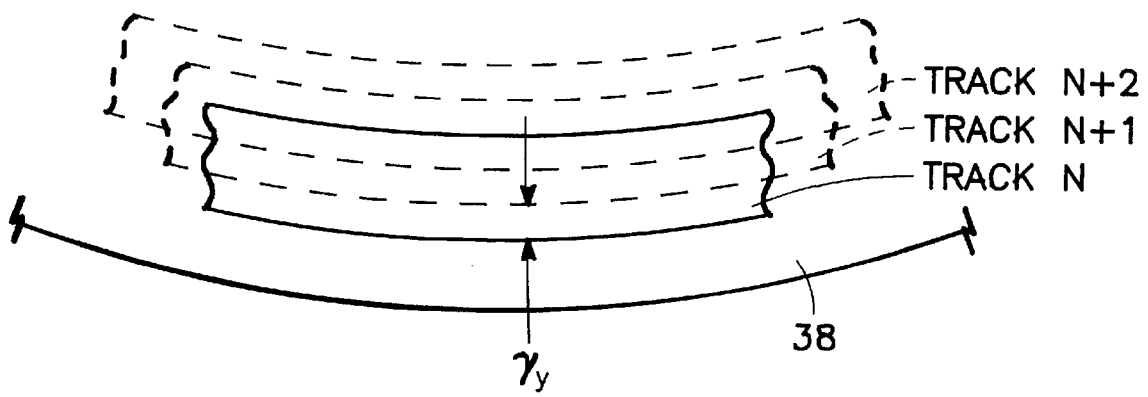
FIG. 18 is a diagram corresponding to FIG. 17 illustrating how tracks are overlapped by multiplexing in the radial direction.

FIG. 18 is a diagram corresponding to FIG. 17 illustrating how tracks are overlapped by multiplexing in the radial direction. Referring to FIGS. 17 and 18 along with FIGS. 11–14, while the embodiment of FIG. 17 has no overlapping of adjacent tracks (i.e., multiplexing of holograms along the radial or y-direction), overlapping of adjacent tracks may be achieved as illustrated in FIG. 18 by selecting a diffractive element which provides a two-dimensional array of beam sources 128.

Figure 19:
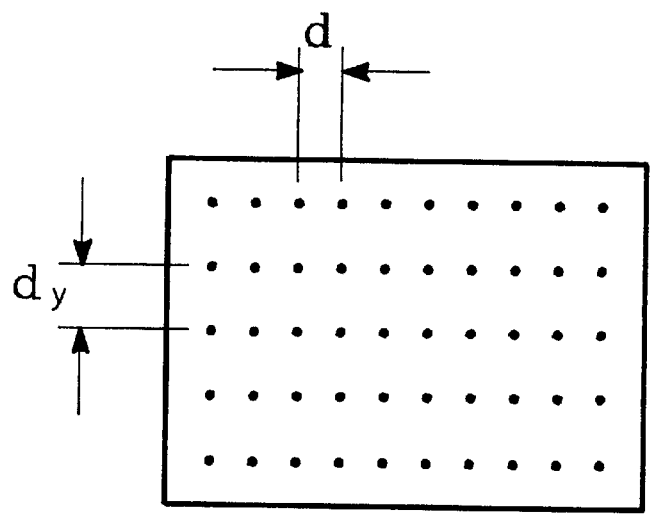
FIG. 19 is a diagram of an output face of a point source array employed in the embodiment of FIG. 18.

Referring to FIGS. 17 and 18 along with FIGS. 11–14, FIG. 19 is a diagram of an output face of a point source array employed in the embodiment of FIG. 18. The output face of the Dammann grating or diffractive element 122 as Fourier transformed by the lens 126 is illustrated in FIG. 19, which the spacing between point sources in the along-track or x-direction is $$d \approx \frac{F_r \lambda_1}{L \tan \theta_1} \quad (12)$$

as stated above, while the spacing in the radial or y-direction is $$d_y = F_r \sqrt{\frac{\lambda_1}{L}} \quad (13)$$

In the two-dimensional array diffractive element 12 of FIG. 17, the number of point sources M the along-track or x-direction may be greater than the number of point sources $M_y$ the radial or y-direction. Thus, the incremental shift spacing $\delta_1$ between successive holograms along the x-direction is as given above, namely, $\delta_1 = \lambda_1 / M \Delta \theta_1$ while along the y-direction the incremental shift spacing $\delta_y$ between successive holograms is $\delta_y = \lambda_1 / M_y \Delta \theta_y$, where $\Delta \theta_y \approx d_y / F_r$.

FIG. 20 is a diagram useful for the analysis geometry of the holographic storage system of FIGS. 11–14. For $\lambda_1$ and $\lambda_2$ dual wavelength recording and reconstruction of FIGS. 11–14, $R_1$ is the central component of the fan at wavelength $\lambda_1$ that is used to record a hologram with the signal beam $S_1$. Note that in this case the recording beams are off-axis: $R_1$ is incident at angle $\theta'$, and $S_1$ is incident at angle $\theta_1 + \theta'$ with respect to the z axis. This arrangement is necessary so that upon read-out the reference fan is again centered on axis. Therefore the central component $R_2$ of the fan is incident at angle zero, and the reconstruction occurs at angle $\theta_2$. The three angles $\theta_1$, $\theta_2$, $\theta'$ are related by:

$$\frac{\sin \frac{\theta_1}{2}}{\lambda_1} = \frac{\sin \frac{\theta_1}{2}}{\lambda_2} \quad (14)$$

$$\theta' = \frac{\theta_1 - \theta_2}{2} \quad (15)$$

The angular separation between the read-out beams (at wavelength $\lambda_2$) are denoted by $\Delta \theta_2$. This satisfies the Bragg mismatch condition (21), which becomes $$\Delta \theta_2 = \frac{\lambda_2}{L \tan \theta_2} \quad (16)$$

and then the shift selectivity is:

$$\delta = \frac{\lambda_2}{M \Delta \theta_2} \quad (17)$$

Upon recording, the angular separation between the reference beams (at wavelength $\lambda_1$) satisfies the relationship $$\Delta \theta_1 = \frac{\lambda_1 \cos \frac{\theta_2}{2}}{\lambda_2 \cos \frac{\theta_1}{2}} \Delta \theta_2 \approx \frac{\lambda_1}{\lambda_2} \Delta \theta_2 \quad (18)$$

where the last approximation is valid for $\sin \theta_{1,2} \ll 1$. The significance of the last relationship is the following: In order to generate the reference fan from a single beam (that is generally available), diffractive optical elements are used, such as Dammann gratings. The angular separation between components of the output of such a grating scales with wavelength exactly like the approximate form of eq. 18. Therefore one can design and use the same Dammann grating for the recording and read-out reference fans, even though they operate at different wavelengths in order to get correct Bragg-matching. Moreover, since the Dammann grating can be illuminated at any angle without significant degradation of its diffraction properties, it can be used simultaneously for recording and readout in a RAM system.

While the invention has been described with reference to embodiments in which the reference lens is spherical (so as to provide either a single spherical wave as in FIGS. 1–4 or a fan of plane waves as in FIGS. 11–14), the shift multiplexing of the invention described above may also be achieved using different types of reference beams other than a single plane wave. For example, cylindrical waves may be employed (in which case the reference lens is a cylindrical lens) or elliptical waves may be employed (in which case the reference lens is an elliptical lens). In general, the invention may employ any one of a large variety of non-planar reference waves to attain shift-selective properties in holographic reconstruction. Multiple plane waves and a spherical wave are but two examples of non-planar wavefronts, but the invention is not limited thereto. Clearly, any generalization of non-planar wavefronts may be employed in carrying out the invention.

While the invention has been described in detail by specific reference to preferred embodiments, it is understood that variations and modifications thereof may be made without departing from the true spirit and scope of the invention.

What is claimed is:

1. A holographic reconstruction device for reconstructing successive holograms previously recorded by interfering a recording reference beam with an information carrying signal beam in a photosensitive holographic recording medium having a z axis perpendicular to said recording medium, each previously recorded successive hologram being spaced apart a recording displacement, wherein said recording reference beam has a recording wavelength in the range where the recording medium is photosensitive and said recording reference beam forms a recording propagation angle, said reconstruction device comprising:

a reconstruction mechanism comprising a reconstruction reference beam having a reconstruction wavelength in the range where the recording medium is relatively photo-insensitive and a reconstruction propagation angle, wherein said reconstruction reference beam is provided with a focus along a fixed axis onto said recording medium, means for producing a succession of relative displacements in said recording medium; and detection means for detecting reconstruction of said previously recorded holograms at said reconstruction wavelength.

2. The invention as set forth in claim 1, wherein said recording reference beam is a spherical wave.

3. The invention as set forth in claim 2, wherein said reconstruction reference beam is a spherical wave.

4. The invention as set forth in claim 1, further comprising a translation mechanism for moving said reconstruction reference beam along said fixed axis to vary the focus of said reconstruction reference beam.

5. The invention as set forth in claim 3, wherein said spherical wave is comprised of a collimated light beam passed through a spherical lens with a focus and mounted on a translation stage, and further comprising translation means for moving said translation stage arbitrary distances along said fixed axis during reconstruction.

6. The invention as set forth in claim 1, wherein a reconstruction reference beam source is located a reconstruction distance from said recording medium suitable to focus reconstruction of said previously recorded holograms.

7. The invention as set forth in claim 6, wherein a recording reference beam source is located a recording distance from said medium along said fixed axis, and wherein said reconstruction distance equals said recording distance multiplied by a ratio of the recording wavelength to the reconstruction wavelength.

8. The invention as set forth in claim 7, further comprising matching means for producing a transverse displacement between said recording medium and said reconstruction reference beam suitable to Bragg match said reconstruction of said previously recorded holograms.

9. The invention as set forth in claim 8, wherein said transverse displacement equals a combination of a quotient minus one, said quotient being said reconstruction wavelength divided by said recording wavelength, the combination multiplied by 0.5, multiplied by said recording propagation angle, and multiplied by said reconstruction distance.

10. The invention as set forth in claim 8, wherein said matching means is a shifting mechanism for shifting said recording medium transversely a certain distance suitable to Bragg match said reconstruction of said previously recorded holograms.

11. The invention as set forth in claim 1, wherein said reconstruction propagation angle is equal to said recording propagation angle multiplied by a ratio of said reconstruction wavelength to said recording wavelength.

12. The invention as set forth in claim 1, wherein said recording and reconstruction reference beams comprise a fan of M amount of waves.

13. The invention as set forth in claim 12, wherein said fan of M waves comprise one of a class of radiation waves including (a) plane waves, (b) spherical waves, (c) cylindrical waves, and (d) elliptical waves.

14. The invention as set forth in claim 12, wherein said fan of M waves is comprised of plane waves of equal power intersecting at said recording medium.

15. The invention as set forth in claim 12, wherein said fan of M waves is a fan of M plane waves, and wherein said fan of M plane waves of said recording and reconstruction reference beams have central components, wherein said central component of said fan of M plane waves of said recording reference beam is incident obliquely on said recording medium at said recording wavelength and said central component of said fan of M plane waves of said reconstruction reference beam is incident along the z-axis on said recording medium at said reconstruction wavelength.

16. The invention as set forth in claim 15, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

17. The invention as set forth in claim 15, wherein an angular separation between components of said fan of M plane waves of said recording reference beam equals a ratio of said recording wavelength to a product of a thickness of said recording medium times the tangent of an angle formed between said central component of said fan of M plane waves of said recording reference beam and said signal beam.

18. The invention as set forth in claim 15, wherein an angular separation between components of said fan of M plane waves of said reconstruction reference beam equals a ratio of said reconstruction wavelength to a product of a thickness of said recording medium times the tangent of an angle formed between said central component of said fan of M plane waves of said reconstruction reference beam and said signal beam.

19. The invention as set forth in claim 15, wherein said recording fan of M plane waves is comprised of a collimated light beam at said recording wavelength passed through a diffractive optical element suitable for generating said fan of M plane waves of equal power and wherein said reconstructing fan of M plane waves is comprised of a collimated light beam at said reconstruction wavelength passed through a diffractive optical element suitable for generating said fan of M plane waves of equal power.

20. The invention as set forth in claim 19, wherein said diffractive optical elements are Dammann gratings.

21. The invention as set forth in claim 19, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

22. The invention as set forth in claim 20, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

23. The invention as set forth in claim 15, wherein said fan of M plane waves of said recording reference beam is comprised of a collimated light beam at said recording wavelength passed obliquely through a diffractive optical element suitable for generating said fan of M plane waves of equal power and said fan of M plane waves of said reconstruction reference beam is comprised of a collimated light beam at said reconstruction wavelength passed normally through said diffractive optical element suitable for generating said fan of M plane waves of equal power, said diffractive optical element being oriented parallel to said recording medium during both recording and reconstruction of the holograms.

24. The invention as set forth in claim 23, wherein said diffractive optical elements are Dammann gratings.

25. The invention as set forth in claim 23, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

26. The invention as set forth in claim 24, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

27. The invention as set forth in claim 1, wherein said recording medium is a photorefractive material.

28. The invention as set forth in claim 1, wherein said recording medium is disk-shaped.

29. The invention as set forth in claim 1, wherein said detection means includes relocation means for relocating said detection means an angular distance from said recording medium suitable to detect reconstruction of said previously recorded holograms at the recording wavelength.

30. The invention as set forth in claim 1, wherein said holograms comprise one of (a) image plane holograms, (b) Fourier transform holograms, (c) Fresnel plane holograms.

31. The invention as set forth in claim 1, wherein said detection means is comprised of a first detector for detecting light diffracted from said reconstruction reference beam and a second detector for detecting light diffracted from said recording reference beam.

32. The invention as set forth in claim 31, wherein said second detector lies on an optical axis of said signal beam, and said first detector is located with respect to said second detector at a direction perpendicular to said optical axis of said signal beam and at a distance equal to the product of the focal length of a lens producing said reconstruction reference beam multiplied by a combination of a ratio minus 1, the ratio being defined by said reconstruction wavelength divided by said recording wavelength.

33. The invention as set forth in claim 1, wherein said detection means comprises a single detector capable of detecting light diffracted from both said reconstruction reference beam and said recording reference beam.

34. A method of reconstructing successive holograms previously recorded by a recording reference beam in a recording medium having a z axis perpendicular to said recording medium, each previously recorded successive hologram being spaced apart a recording displacement, and wherein said recording reference beam has a recording wavelength in the range where the recording medium is photosensitive and said recording reference beam forms a recording angle with said signal beam, said method comprising the steps of:

(a) providing a reconstruction reference beam having a reconstruction wavelength in the range where the recording medium is relatively photo-insensitive and a reconstruction propagation angle fixed with respect to said z axis onto said recording medium;

(b) producing a succession of relative displacements in said recording medium, each of said displacements being equal to the distance of said recording displacements with which said holograms were previously recorded; and (c) detecting reconstruction of said previously recorded holograms at said reconstruction wavelength.

35. The method of claim 34, wherein said recording and reconstruction reference beams are spherical waves.

36. The method of claim 35, further comprising, before step (a), the step of producing a transverse displacement between said recording medium and said reconstruction reference beam suitable to Bragg match said reconstruction of said previously recorded holograms.

37. The method of claim 36, wherein said transverse displacement equals a combination of a quotient minus one, said quotient being said reconstruction wavelength divided by said recording wavelength, the combination multiplied by 0.5, multiplied by said recording propagation angle, and multiplied by a reconstruction distance, wherein a reconstruction beam source is located said reconstruction distance from said recording medium along said fixed axis.

38. The method of claim 34, further comprising, before step (a), the step of locating a reconstruction reference beam source a reconstruction distance from said recording medium suitable to focus reconstruction of said previously recorded holograms.

39. The method of claim 38, wherein a recording reference beam source is located a recording distance from said medium along said z axis, and wherein said reconstruction distance equals said recording distance multiplied by the ratio of said recording wavelength to said reconstruction wavelength.

40. The method of claim 34, wherein said recording and reconstruction reference beams comprise a fan of M amount of waves.

41. The method of claim 40, wherein said fan of M waves comprise one of a class of radiation waves including (a) plane waves, (b) spherical waves, (c) cylindrical waves, and (d) elliptical waves.

42. The method of claim 40, wherein said fan of M waves is comprised of plane waves of equal power intersecting at said recording medium.

43. The method of claim 42, wherein said fan of M waves is a fan of M plane waves, and wherein said fan of M plane waves of said recording and reconstruction reference beams have central components, wherein said central component of said fan of M plane waves of said recording reference beam is incident obliquely on said recording medium at said recording wavelength and said central component of said fan of M plane waves of said reconstruction reference beam is incident along the z-axis on said recording medium at said reconstruction wavelength.

44. The method of claim 43, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

45. The method of claim 43, wherein an angular separation between components of said fan of M plane waves of said recording reference beam equals a ratio of said recording wavelength to a product of a thickness of said recording medium times the tangent of an angle formed between said central component of said fan of M plane waves of said recording reference beam and said signal beam.

46. The method of claim 43, wherein an angular separation between components of said fan of M plane waves of said reconstruction reference beam equals a ratio of said reconstruction wavelength to a product of a thickness of said recording medium times the tangent of an angle formed between said central component of said fan of M plane waves of said reconstruction reference beam and said signal beam.

47. The method of claim 43, wherein said fan of M plane waves of said recording reference beam is produced by passing a collimated light beam at said recording wavelength through a diffractive optical element suitable for generating said fan of M plane waves of equal power and wherein said fan of M plane waves of said reconstruction reference beam is produced by passing a collimated light beam at said reconstruction wavelength through a diffractive optical element suitable for generating said fan of M plane waves of equal power.

48. The method of claim 47, wherein said diffractive optical elements are Dammann gratings.

49. The method of claim 47, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

50. The method of claim 48, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

51. The method of claim 43, wherein said fan of M plane waves of said recording reference beam is produced by passing a collimated light beam at said recording wavelength obliquely through a diffractive optical element suitable for generating said fan of M plane waves of equal power and wherein said fan of M plane waves of said reconstruction reference beam is produced by passing a collimated light beam at said reconstruction wavelength normally through a diffractive optical element suitable for generating said fan of M plane waves of equal power, said diffractive optical element being oriented parallel to said recording medium during both recording and reconstruction of said holograms.

52. The method of claim 51, wherein said diffractive optical elements are Dammann gratings.

53. The method of claim 51, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

54. The method of claim 52, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

55. The method of claim 34, wherein said reconstruction propagation angle is equal to said recording angle multiplied by a ratio of said reconstruction wavelength to said recording wavelength.

56. The method of claim 34, wherein said recording medium is a photorefractive material.

57. The method of claim 34, wherein said recording medium is disk-shaped.

58. The method of claim 34, wherein said holograms comprise one of (a) image plane holograms, (b) Fourier transform holograms, (c) Fresnel plane holograms.

59. The method of claim 34, wherein said step of detecting further comprises the step of relocating a detector an angular distance from said recording medium suitable to detect reconstruction of said previously recorded holograms at the recording wavelength.

60. The method of claim 59, wherein said second detector lies on an optical axis of said signal beam, and said first detector is located with respect to said second detector at a direction perpendicular to said optical axis of said signal beam and at a distance equal to the product of the focal length of a lens producing said reconstruction reference beam multiplied by a combination of a ratio minus 1, the ratio being defined by said reconstruction wavelength divided by said recording wavelength.

61. The method of claim 34, wherein said step of detecting comprises providing a first detector for detecting reconstruction of said previously recorded holograms at the reconstruction wavelength and a second detector for detecting reconstruction of said previously recorded holograms at the recording wavelength.

62. The method of claim 61, wherein said second detector lies on an optical axis of said signal beam, and said first detector is located with respect to said second detector at a direction perpendicular to said optical axis of said signal beam and at a distance equal to the product of the focal length of a lens producing said reconstruction reference beam multiplied by a combination of a ratio minus 1, the ratio being defined by said reconstruction wavelength divided by said recording wavelength.

63. The method of claim 34, wherein said step of detecting utilizes detection means comprising a single detector, wherein said detector detects light diffracted from both said reconstruction reference beam and said recording reference beam.

64. A holographic storage device for recording and reconstructing successive holograms in a recording medium having a z axis perpendicular to said recording medium, said device comprising:
  a recording mechanism comprising,
    a means for generating a recording reference beam, said reference beam having a recording wavelength in the range where said recording medium is photosensitive, a recording propagation angle for providing said recording reference beam to a diffraction grating and said recording medium incident at an oblique angle, and a succession of signal beams intersecting said recording reference beam within said recording medium to thereby record successive holograms, each being spaced apart a recording displacement;
  a reconstruction mechanism comprising,
    a means for generating a reconstruction reference beam, said reconstruction reference beam having a reconstruction wavelength in the range where said recording medium is relatively photo-insensitive, a reconstruction propagation angle for providing said reconstruction reference beam to said diffraction grating and to said recording medium incident at a fixed angle, and means for producing a succession of relative displacements in said recording medium, each of said displacements being appropriate for Bragg-matching the previously recorded said holograms at said reconstruction wavelength; and detection means for detecting reconstruction of said previously recorded holograms at said reconstruction wavelength.

65. The invention as set forth in claim 64, wherein said recording reference beam is a spherical wave and said reconstruction reference beam is a spherical wave.

66. The invention as set forth in claim 65, wherein said spherical wave of said recording reference beam comprises a collimated light beam passed through a spherical lens and said spherical wave of said reconstruction reference beam comprises a collimated light beam passed through a spherical lens.

67. The invention as set forth in claim 66, wherein said spherical lens of said recording reference beam and said spherical lens of said reconstruction reference beam are identical.

68. The invention as set forth in claim 65, wherein said reconstruction reference beam is located a reconstruction distance from said recording medium suitable to focus reconstruction of said previously recorded holograms.

69. The invention as set forth in claim 68, wherein a recording reference beam source is located a recording distance from said medium along said z axis, and wherein said reconstruction distance equals said recording distance multiplied by a ratio of the wavelength of said recording reference beam to the wavelength of said reconstruction reference beam.

70. The invention as set forth in claim 66, wherein said spherical lens is mounted on a translation stage for translating said lens along an axis at said reconstruction propagation angle with said z-axis suitable to focus reconstruction of said previously recorded holograms.

71. The invention as set forth in claim 64, further comprising matching means for producing a transverse displacement between said recording medium and said reconstruction reference beam suitable to Bragg match said reconstruction of said previously recorded holograms.

72. The invention as set forth in claim 71, wherein said transverse displacement equals a combination of a quotient minus one, said quotient being said reconstruction wavelength divided by said recording wavelength, the combination multiplied by 0.5, multiplied by said recording propagation angle, and multiplied by a reconstruction distance, wherein a reconstruction beam source is located said reconstruction distance from said recording medium along said z axis.

73. The invention as set forth in claim 71, wherein said matching means is a shifting mechanism for shifting said recording medium transversely a certain distance suitable to Bragg match said reconstruction of said previously recorded holograms.

74. The invention as set forth in claim 65, wherein said recording and reconstruction reference beams comprise a fan of M amount of waves.

75. The invention as set forth in claim 74, wherein said fan of M waves comprise waves within one of a class of radiation waves including (a) plane waves, (b) spherical waves, (c) cylindrical waves, and (d) elliptical waves.

76. The invention as set forth in claim 74, wherein said fan of M waves is comprised of plane waves of equal power intersecting at said recording medium.

77. The invention as set forth in claim 74, wherein said fan of M waves is a fan of M plane waves, and wherein said fan of M plane waves of said recording and reconstruction reference beams have central components, wherein said central component of said fan of M plane waves of said recording reference beam is incident obliquely on said recording medium at said recording wavelength and said central component of said fan of M plane waves of said reconstruction reference beam is incident along the z-axis on said recording medium at said reconstruction wavelength.

78. The invention as set forth in claim 77, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

79. The invention as set forth in claim 77, wherein an angular separation between components of said fan of M plane waves of said recording reference beam equals a ratio of said recording wavelength to a product of a thickness of said recording medium times the tangent of an angle formed between said central component of said fan of M plane waves of said recording reference beam and said signal beam.

80. The invention as set forth in claim 77, wherein an angular separation between components of said fan of M plane waves of said reconstruction reference beam equals a ratio of said reconstruction wavelength to a product of a thickness of said recording medium times the tangent of an angle formed between said central component of said fan of M plane waves of said reconstruction reference beam and said signal beam.

81. The invention as set forth in claim 77, wherein said recording fan of M plane waves is comprised of a collimated light beam at said recording wavelength passed through a diffractive optical element suitable for generating said fan of M plane waves of equal power and wherein said reconstructing fan of M plane waves is comprised of a collimated light beam at said reconstruction wavelength passed through a diffractive optical element suitable for generating said fan of M plane waves of equal power.

82. The invention as set forth in claim 81, wherein said diffractive optical elements are Dammann gratings.

83. The invention as set forth in claim 81, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

84. The invention as set forth in claim 82, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

85. The invention as set forth in claim 77, wherein said fan of M plane waves of said recording reference beam is comprised of a collimated light beam at said recording wavelength passed obliquely through a diffractive optical element suitable for generating said fan of M plane waves of equal power and said fan of M plane waves of said reconstruction reference beam is comprised of a collimated light beam at said reconstruction wavelength passed normally through said diffractive optical element suitable for generating said fan of M plane waves of equal power, said diffractive optical element being oriented parallel to said recording medium during both recording and reconstruction of the holograms.

86. The invention as set forth in claim 85, wherein said diffractive optical elements are Dammann gratings.

87. The invention as set forth in claim 85, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

88. The invention as set forth in claim 86, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

89. The invention as set forth in claim 64, wherein said reconstruction propagation angle is equal to said recording propagation angle multiplied by a ratio of said reconstruction wavelength to said recording wavelength.

90. The invention as set forth in claim 64, wherein said recording medium is a photorefractive material.

91. The invention as set forth in claim 64, wherein said recording medium is disk-shaped.

92. The invention as set forth in claim 64, wherein said holograms comprise one of (a) image plane holograms, (b) Fourier transform holograms, (c) Fresnel plane holograms.

93. The invention as set forth in claim 64 wherein said detection means includes relocation means for relocating said detection means a distance from said recording medium suitable to detect reconstruction of said previously recorded holograms at said recording wavelength.

94. The invention as set forth in claim 93, wherein said second detector lies on an optical axis of said signal beam, and said first detector is located with respect to said second detector at a direction perpendicular to said optical axis of said signal beam and at a distance equal to the product of the focal length of a lens producing said reconstruction reference beam multiplied by a combination of a ratio minus 1, the ratio being defined by said reconstruction wavelength divided by said recording wavelength.

95. The invention as set forth in claim 64, wherein said detection means comprises a first detector and a second detector, wherein said first detector detects light diffracted from said reconstruction reference beam and said second detector detects light diffracted from said recording reference beam.

96. The invention as set forth in claim 95, wherein said second detector lies on an optical axis of said signal beam, and said first detector is located with respect to said second detector at a direction perpendicular to said optical axis of said signal beam and at a distance equal to the product of the focal length of a lens producing said reconstruction reference beam multiplied by a combination of a ratio minus 1, the ratio being defined by said reconstruction wavelength divided by said recording wavelength.

97. The invention as set forth in claim 64, wherein said detection means comprises a single detector, wherein said detector detects light diffracted from both said reconstruction reference beam and said recording reference beam.

98. A method for recording and reconstructing successive holograms in a recording medium having a z axis perpendicular to said recording medium, said method comprising the steps of:
 (a) providing a recording reference beam, having a recording wavelength in the range where the recording medium is photosensitive and a recording propagation angle, to a diffraction grating and to said recording medium incident at an oblique angle;
 (b) providing a succession of signal beams intersecting said recording reference beam within said recording medium to thereby record successive holograms, each being spaced apart a recording displacement;
 (c) providing a reconstruction reference beam, having a reconstruction wavelength in the range where the recording medium is photo-insensitive and a reconstruction propagation angle, to said diffraction grating and to said recording medium incident at a fixed angle;
 (d) producing a succession of relative displacements in said recording medium, each of said displacements being equal to the distance of said recording displacements with which said holograms were previously recorded by said recording reference beam; and
 (e) detecting reconstruction of said previously recorded holograms at said reconstruction wavelength.

99. The method of claim 98, wherein said recording and reconstruction reference beams are spherical waves.

100. The method of claim 98, further comprising, before step (a), the step of producing a transverse displacement between said recording medium and said reconstruction reference beam suitable to Bragg match said reconstruction of said previously recorded holograms.

101. The method of claim 100, wherein said transverse displacement equals a combination of a quotient minus one, said quotient being said reconstruction wavelength divided by said recording wavelength, the combination multiplied by 0.5, multiplied by said recording propagation angle, and multiplied by a reconstruction distance, wherein a reconstruction beam source is located said reconstruction distance from said recording medium along said z axis.

102. The method of claim 99, further comprising, before step (a), the step of locating a reconstruction reference beam source a reconstruction distance from said recording medium suitable to focus reconstruction of said previously recorded holograms.

103. The method of claim 102, wherein a recording reference beam source is located a recording distance from said medium along said z axis, and wherein said reconstruction distance equals said recording distance multiplied by the ratio of said recording wavelength to said reconstruction wavelength.

104. The method of claim 98, wherein said recording and reconstruction reference beams comprise a fan of M amount of waves.

105. The method of claim 104, wherein said fan of M waves comprise one of a class of radiation waves including (a) plane waves, (b) spherical waves, (c) cylindrical waves, and (d) elliptical waves.

106. The method of claim 105, wherein said fan of M waves is comprised of plane waves of equal power intersecting at said recording medium.

107. The method of claim 106, wherein said fan of M waves is a fan of M plane waves, and wherein said fan of M plane waves of said recording and reconstruction reference beams have central components, wherein said central component of said fan of M plane waves of said recording reference beam is incident obliquely on said recording medium at said recording wavelength and said central component of said fan of M plane waves of said reconstruction reference beam is incident along the z-axis on said recording medium at said reconstruction wavelength.

108. The method of claim 107, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

109. The method of claim 107, wherein an angular separation between components of said fan of M plane waves of said recording reference beam equals a ratio of said recording wavelength to a product of a thickness of said recording medium times the tangent of an angle formed between said central component of said fan of M plane waves of said recording reference beam and said signal beam.

110. The method of claim 107, wherein an angular separation between components of said fan of M plane waves of said reconstruction reference beam equals a ratio of said reconstruction wavelength to a product of a thickness of said recording medium times the tangent of an angle formed between said central component of said fan of M plane waves of said reconstruction reference beam and said signal beam.

111. The method of claim 104, wherein said fan of M plane waves of said recording reference beam is produced by passing a collimated light beam at said recording wavelength through a diffractive optical element suitable for generating said fan of M plane waves of equal power and wherein said fan of M plane waves of said reconstruction reference beam is produced by passing a collimated light beam at said reconstruction wavelength through a diffractive optical element suitable for generating said fan of M plane waves of equal power.

112. The method of claim 110, wherein said diffractive optical elements are Dammann gratings.

113. The method of claim 110, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

114. The method of claim 112, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

115. The method of claim 104, wherein said fan of M plane waves of said recording reference beam is produced by passing a collimated light beam at said recording wavelength obliquely through a diffractive optical element suitable for generating said fan of M plane waves of equal power and wherein said fan of M plane waves of said reconstruction reference beam is produced by passing a collimated light beam at said reconstruction wavelength normally through a diffractive optical element suitable for generating said fan of M plane waves of equal power, said diffractive optical element being oriented parallel to said recording medium during both recording and reconstruction of said holograms.

116. The method of claim 113, wherein said diffractive optical elements are Dammann gratings.

117. The method of claim 115, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

118. The method of claim 116, wherein a ratio of the sine of the half-angle formed between said central component of said fan of M plane waves of said recording reference beam and said signal beam to said recording wavelength equals a ratio of the sine of a half-angle formed between said central component of said fan of M plane waves of said reconstruction reference beam and a reconstruction beam to said reconstruction wavelength.

119. The method of claim 98, wherein said reconstruction propagation angle is equal to said recording angle multiplied by a ratio of said reconstruction wavelength to said recording wavelength.

120. The method of claim 98, wherein said recording medium is a photorefractive material.

121. The method of claim 98, wherein said recording medium is disk-shaped.

122. The method of claim 98, wherein said holograms comprise one of (a) image plane holograms, (b) Fourier transform holograms, (c) Fresnel plane holograms.

123. The method of claim 98, wherein said step of detecting further comprises the step of relocating a detector an angular distance from said recording medium suitable to detect reconstruction of said previously recorded holograms at the recording wavelength.

124. The method of claim 123, wherein said detector lies on an optical axis of said signal beams, and said detector is located at a direction perpendicular to said optical axis of said signal beams and at a distance equal to the product of the focal length of a lens producing said reconstruction reference beam multiplied by a combination of a ratio minus 1, the ratio being defined by said reconstruction wavelength divided by said recording wavelength.

125. The method of claim 98, wherein said step of detecting comprises providing a first detector for detecting reconstruction of said previously recorded holograms at the reconstruction wavelength and a second detector for detecting reconstruction of said previously recorded holograms at the recording wavelength.

126. The method of claim 125, wherein said second detector lies on an optical axis of said signal beams, and said first detector is located with respect to said second detector at a direction perpendicular to said optical axis of said signal beams and at a distance equal to the product of the focal length of a lens producing said reconstruction reference beam multiplied by a combination of a ratio minus 1, the ratio being defined by said reconstruction wavelength divided by said recording wavelength.

127. The method of claim 98, wherein said step of detecting comprises providing detection means comprising a single detector, wherein said detector detects light diffracted from both said reconstruction reference beam and said recording reference beam.

128. A holographic recording device for recording successive holograms in a recording medium, comprising:

a recording mechanism for providing at least a fan of M amount of waves along at least a first axis with a separation angle between adjacent waves and directing said fan of M waves as a reference beam along a reference beam path onto said recording medium;

signal means for successively modulating a wave with a succession of images to produce a succession of signal beams along a signal beam path lying at a propagation angle relative to said reference beam path so that said signal and reference beams intersect at a beam intersection lying within said medium, said beam intersection having a size corresponding to beam areas of said reference and signal beams; and displacement means for producing a succession of relative displacements a direction parallel to said first axis between said recording medium and said beam intersection of said signal and reference beam paths in synchronism with said succession of signal beams, each of said displacements being less than said size of said intersection whereby to record successive holograms partially overlapped along a direction of said displacements.

129. The apparatus of claim 128, wherein said first axis and said signal beam path are parallel and said M waves of said reference beam and of said signal beam have a wavelength, said recording medium has a thickness and said separation angle of said fan of M waves is at least approximately equal to said wavelength divided by the product of said thickness and the tangent of said propagation angle.

130. The apparatus of claim 128, wherein each of said relative displacements is of a length at least approximately equal to said wavelength divided by the product of M multiplied by said separation angle.

131. The apparatus of claim 128, further comprising means for temporarily halting said succession of signal beams after a predetermined number of said relative displacements have been produced, means for moving said recording medium and said beam intersection relative to one another until said beam intersection does not intersect the first one of said holograms recorded with said succession of relative displacements, and means for resuming the signal means for producing of a succession of signal beams and the displacement means for producing of a succession of relative displacements.

132. The apparatus of claim 131, wherein said predetermined number of relative displacements is equal to M.

133. The apparatus of claim 132, wherein:

said M waves of said reference beam and of said signal beam have a wavelength, said recording medium has a thickness and said separation angle of said fan of M waves is at least approximately equal to said wavelength divided by the product of said thickness and the tangent of said propagation angle;

each of said displacements is of a length at least approximately equal to said wavelength divided by the product of M multiplied by said separation angle.

134. The apparatus of claim 128, wherein said fan of M waves comprise waves within the class of radiation waves including plane waves, cylindrical waves and elliptical waves.

135. The apparatus of claim 128, wherein said recording medium is disk-shaped.

136. The apparatus of claim 128, wherein M is extremely large whereby said fan of M waves is at least substantially a single spherical wave.

137. The apparatus of claim 128, wherein M is equal to infinity whereby said fan of M waves is a single spherical wave.

138. The apparatus of claim 128, wherein said holograms comprise one of (a) image plane holograms, (b) Fourier transform holograms, (c) Fresnel plane holograms.

139. The apparatus of claim 128, wherein said recording mechanism comprises:

a diffraction grating for diffracting a single beam into a line of plural wave sources separated by a spacing; and at least one lens having a focal length for focusing said plural wave sources through said at one lens, wherein said focal length and said spacing being a function of said separation angle.

140. The apparatus of claim 139, wherein said lens is one of (a) spherical, (b) elliptical, (c) cylindrical so that said fan of M waves are one of (a) plane waves, (b) elliptical waves, (c) cylindrical waves, respectively.

141. The apparatus of claim 137, wherein said recording mechanism comprises focusing a coherent plane wave beam through a spherical lens.

142. A holographic reconstruction device for reconstructing at a detection plane successive holograms previously recorded in a recording medium by means for diffracting a succession of signal beams along a signal beam path lying at a propagation angle relative to a reference beam including a fan of M amount of waves, said fan being parallel to the path of said signal beams and having a separation angle between adjacent waves of the fan and displacement means for successively displacing said medium relative to said signal and reference beams in a direction parallel to said first axis by a distance less than the intersection of said reference and signal beams in said recording medium in synchronism with said succession of signal beams, said reconstruction device comprising:

a reconstruction mechanism for providing at least a fan of M waves along at least a first axis corresponding to the direction of the reference beam with which said holograms were previously recorded with a separation angle between adjacent waves and directing said fan of M waves as a reference beam along a reference beam path onto said recording medium;

displacement means for producing a succession of relative displacements a direction parallel to said first axis between said recording medium and said beam intersection of said signal and reference beam paths in synchronism with said succession of signal beams, each of said displacements being equal to the distance of said displacements with which said holograms were previously recorded; and detection means for detecting at said detection plane light diffracted from said reference beam by a succession of said previously recorded holograms.

143. The apparatus of claim 142, wherein said first axis and said signal beam path are parallel and said M waves of said reference beam and of said signal beam have a wavelength, said recording medium has a thickness and said separation angle of said fan of M waves is at least approximately equal to said wavelength divided by the product of said thickness and the tangent of said propagation angle.

144. The apparatus of claim 142, wherein each of said relative displacements is of a length at least approximately equal to said wavelength divided by the product of M multiplied by said separation angle.

145. The apparatus of claim 142, further comprising means for temporarily halting said succession of signal beams after a predetermined number of said relative displacements have been produced, means for moving said recording medium and said beam intersection relative to one another until said beam intersection does not intersect the first one of said holograms recorded with said succession of relative displacements, and means for resuming the signal means for producing of a succession of signal beams and the displacement means for producing of a succession of relative displacements.

146. The apparatus of claim 145, wherein said predetermined number of relative displacements is equal to M.

147. The apparatus of claim 146, wherein:

said M waves of said reference beam and of said signal beam have a wavelength, said recording medium has a thickness and said separation angle of said fan of M waves is at least approximately equal to said wavelength divided by the product of said thickness and the tangent of said propagation angle;

each of said displacements is of a length at least approximately equal to said wavelength divided by the product of M multiplied by said separation angle.

148. The apparatus of claim 142, wherein said fan of M waves comprise waves within the class of radiation waves including plane waves, cylindrical waves and elliptical waves.

149. The apparatus of claim 142, wherein said recording medium is disk-shaped.

150. The apparatus of claim 142, wherein M is extremely large whereby said fan of M waves is at least substantially a single spherical wave.

151. The apparatus of claim 142, wherein M is equal to infinity whereby said fan of M waves is a single spherical wave.

152. The apparatus of claim 142, wherein said holograms comprise one of (a) image plane holograms, (b) Fourier transform holograms, (c) Fresnel plane holograms.

153. The apparatus of claim 142, wherein said recording mechanism comprises:

a diffraction grating for diffracting a single beam into a line of plural wave sources separated by a spacing; and at least one lens having a focal length for focusing said plural wave sources through said at one lens, wherein said focal length and said spacing being a function of said separation angle.

154. The apparatus of claim 153, wherein said lens is one of (a) spherical, (b) elliptical, (c) cylindrical so that said fan of M waves are one of (a) plane waves, (b) elliptical waves, (c) cylindrical waves, respectively.

155. The apparatus of claim 151, wherein said recording mechanism comprises focusing a coherent plane wave beam through a spherical lens.

* * * * *